(12) United States Patent
Alagic et al.

(10) Patent No.: US 11,762,390 B1
(45) Date of Patent: Sep. 19, 2023

(54) AUTONOMOUS MACHINE SAFETY MANAGEMENT IN A DYNAMIC ENVIRONMENT

(71) Applicant: Amazon Technologies, Inc., Seattle, WA (US)

(72) Inventors: Fahrudin Alagic, Malden, MA (US); Stephen Charles Paschall, Cambridge, MA (US); Anatoly Mitlin, Swampscott, MA (US)

(73) Assignee: Amazon Technologies, Inc., Seattle, WA (US)

( * ) Notice: Subject to any disclaimer, the term of this patent is extended or adjusted under 35 U.S.C. 154(b) by 776 days.

(21) Appl. No.: 16/751,713

(22) Filed: Jan. 24, 2020

Related U.S. Application Data

(60) Provisional application No. 62/796,984, filed on Jan. 25, 2019.

(51) Int. Cl.
| | |
|---|---|
| *G05D 1/02* | (2020.01) |
| *G05D 1/00* | (2006.01) |
| *G06T 15/08* | (2011.01) |
| *G06V 10/25* | (2022.01) |
| *G06V 20/56* | (2022.01) |

(52) U.S. Cl.
CPC .......... *G05D 1/0214* (2013.01); *G05D 1/0088* (2013.01); *G05D 1/0223* (2013.01); *G06T 15/08* (2013.01); *G06V 10/25* (2022.01); *G06V 20/56* (2022.01); *G05D 2201/0213* (2013.01); *G06T 2207/10028* (2013.01)

(58) Field of Classification Search
CPC ... G05D 1/0214; G05D 1/0088; G05D 1/0223; G05D 2201/0213; G06V 10/25; G06V 20/56; G06T 15/08; G06T 2207/10028

USPC .......................................................... 701/23
See application file for complete search history.

(56) References Cited

U.S. PATENT DOCUMENTS

| | | | | |
|---|---|---|---|---|
| 2015/0296199 | A1* | 10/2015 | Fuehrer ............... | H04N 13/271 348/47 |
| 2019/0108639 | A1* | 4/2019 | Tchapmi et al. ...... | G06N 3/0445 |
| 2019/0235083 | A1* | 8/2019 | Zhang et al. ......... | G01S 7/4808 |
| 2020/0182631 | A1* | 6/2020 | Yang et al. ........... | G06V 10/993 |
| 2020/0184718 | A1* | 6/2020 | Chiu et al. ............ | G06T 7/20 |
| 2020/0200912 | A1* | 6/2020 | Chen et al. ........... | G01S 17/89 |
| 2021/0049779 | A1* | 2/2021 | Harviainen ........... | H04N 19/54 |
| 2021/0192762 | A1* | 6/2021 | Guan et al. .......... | G06V 20/647 |
| 2021/0200215 | A1* | 7/2021 | Vozar et al. ........... | G07C 5/008 |

FOREIGN PATENT DOCUMENTS

| | | | | |
|---|---|---|---|---|
| JP | 5941475 | B2* | 6/2016 ................... | B60T 7/22 |

OTHER PUBLICATIONS

English Translation for JP5941475B2 (Year: 2022).*

\* cited by examiner

*Primary Examiner* — Mahmoud S Ismail
(74) *Attorney, Agent, or Firm* — Lowenstein Sandler LLP

(57) ABSTRACT

An autonomous robot system to enable flexible, safe, efficient, and automated movement of goods and materials in a dynamic environment including one or more dynamic objects (e.g., humans). The autonomous robot system includes a modular autonomous ground vehicle (AGV) including a vehicle management system having a safety management system. The safety management system includes one or more safety management controllers to perform safety functions to enable the modular AGV to operate safely and efficiently alongside humans in a dynamic environment (e.g., a warehouse or fulfillment facility).

20 Claims, 12 Drawing Sheets

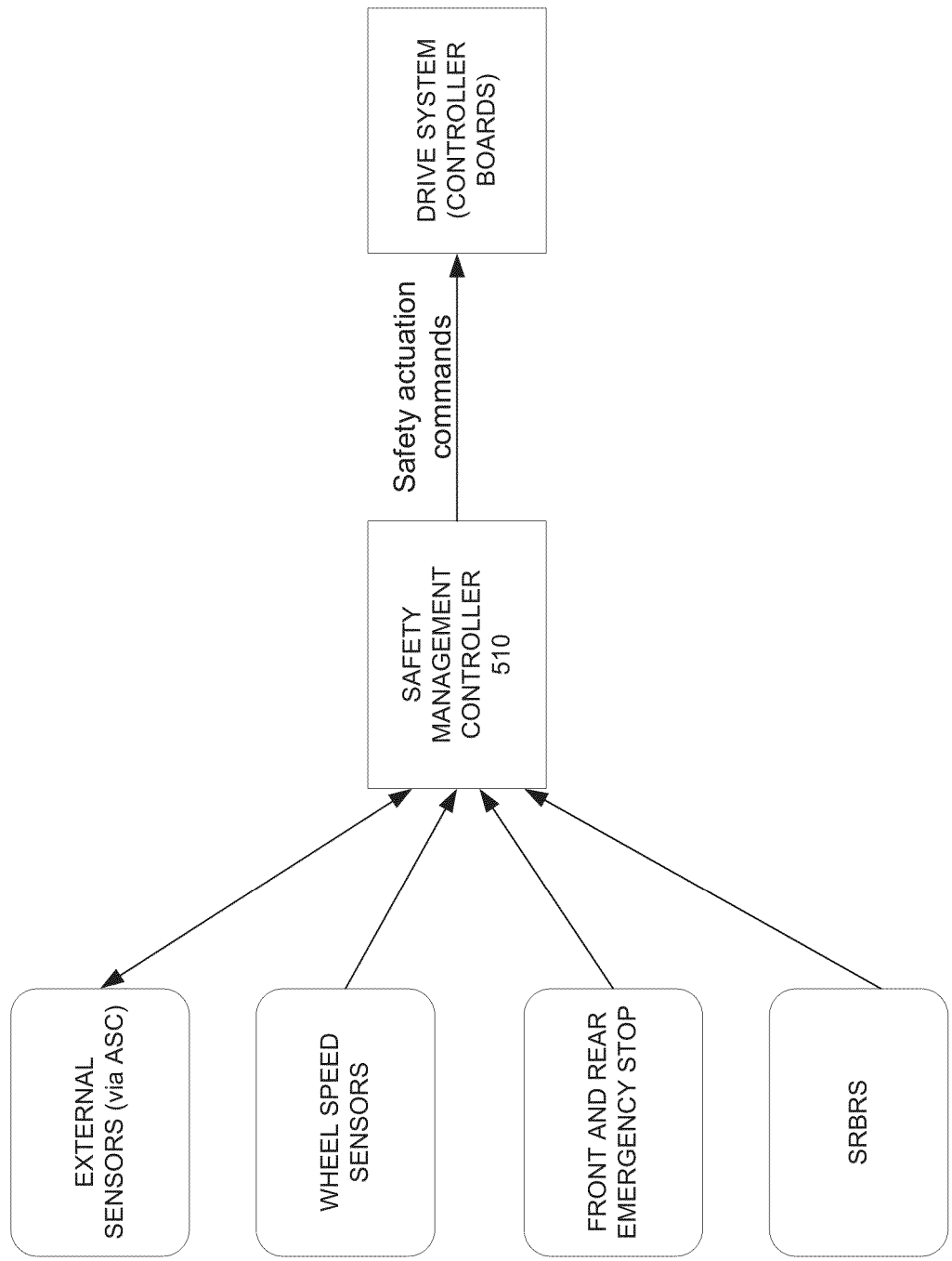

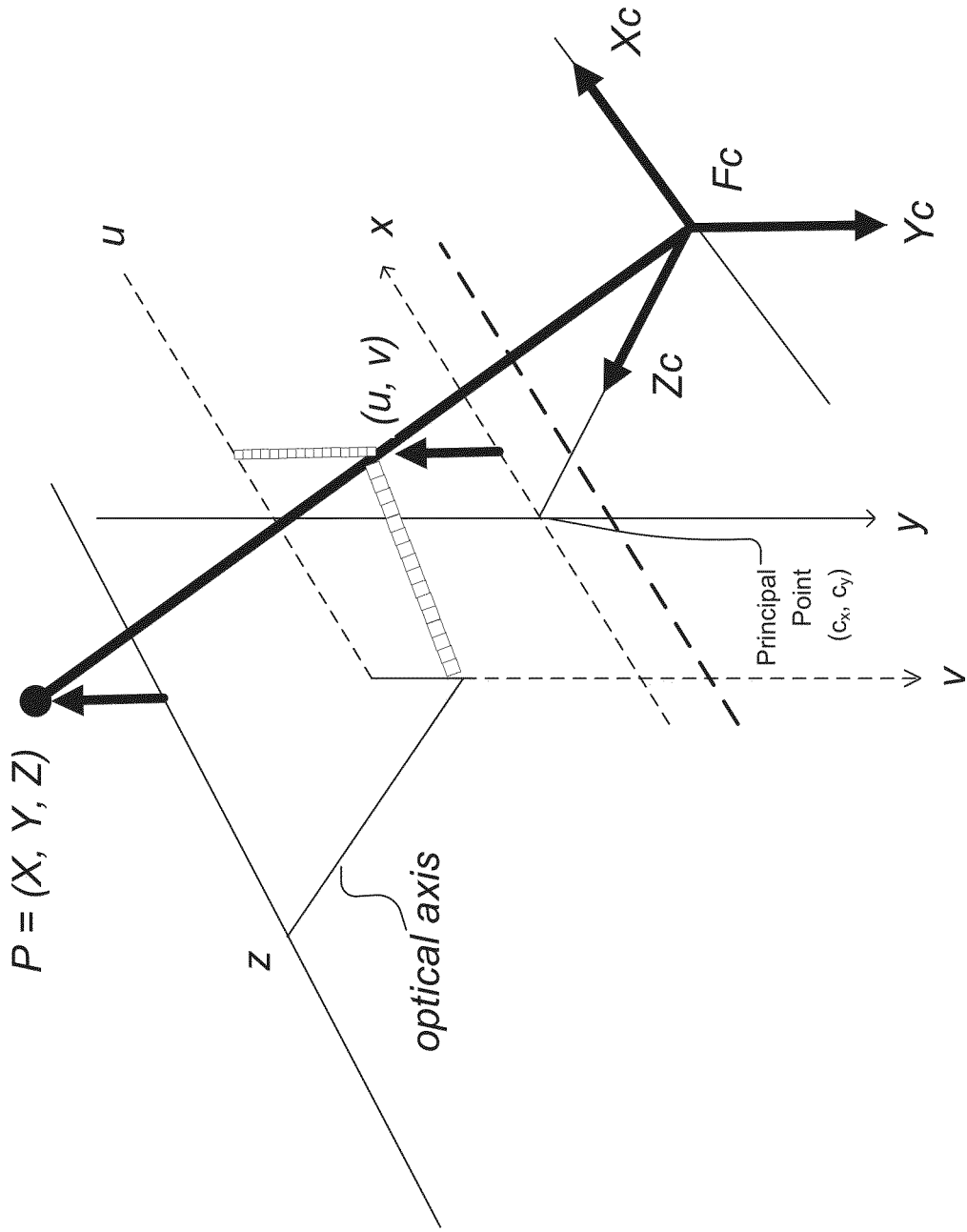

ively, according to one embodiment.
AUTONOMOUS MACHINE SAFETY MANAGEMENT IN A DYNAMIC ENVIRONMENT

CROSS-REFERENCE TO RELATED APPLICATION

This application claims the benefit of U.S. Provisional Application No. 62/796,984, titled "Autonomous Machine Safety Management In a Dynamic Environment," filed Jan. 25, 2019, the entire disclosure of which is incorporated herein by reference.

BACKGROUND

Autonomous machines or autonomous robots can operate in an environment to perform certain tasks, including the conveying of materials from one point to another. The autonomous machines are configured to behave based on information associated with the environment, such as, for example, using autonomous navigation to plan and execute a path of travel without human intervention. Conventionally, autonomous navigation robots are employed in static environments having objects with fixed or known locations that can be considered in setting a motion plan and detected by the robot during navigation. Furthermore, conventional autonomous navigation robots include safety mechanisms that force the robotic vehicle to stop its motion in the presence of an unexpected moving object.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

FIG. 5 is a diagram illustrating an example data flow of a safety management controller coupled to multiple sensors and a drive system, according to one embodiment.

FIG. 7 illustrates safety management processing including projection of an example point in space onto a 2D image sensor, according to one embodiment.

DETAILED DESCRIPTION

Figure 1:
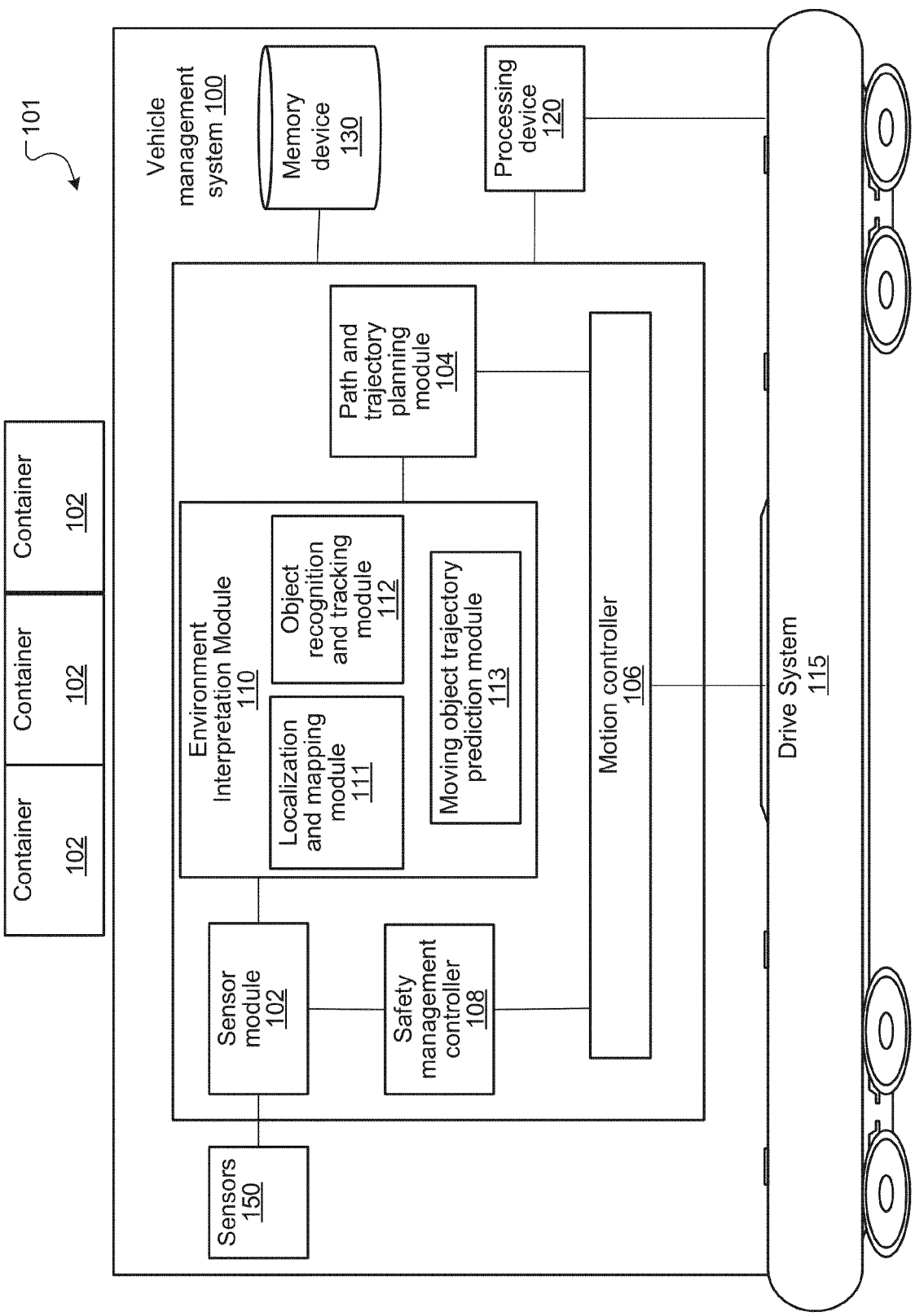
FIG. 1 is a block diagram of an autonomous robotic vehicle including a vehicle management system to enable navigation in a dynamic environment, according to one embodiment.

An autonomous robot system that enables flexible, safe, efficient, and automated movement of goods and materials in a dynamic environment including one or more dynamic objects (e.g., humans). The autonomous robot system includes one or more deliver containers and an autonomous ground vehicle (AGV) including a vehicle management system. The vehicle management system provides real time resource planning and path optimization to enable the AGV to operate safely and efficiently alongside humans in a dynamic environment (e.g., a warehouse or fulfillment facility). The vehicle management system includes one or more processing devices to execute a moving object trajectory prediction module to predict a trajectory of a dynamic or moving object (e.g., a human) in a shared environment.

The vehicle management system can use localization and mapping information associated with the AGV and a predicted trajectory of a dynamic object to establish a path and trajectory for the AGV that enables real-time dynamic obstacle sensing and avoidance. The vehicle management system interprets the current environment including detected dynamic objects and determines updated or adjusted trajectory data to provide to a motion controller for generating drive instructions for execution by a drive system of the AGV. Advantageously, the AGV is configured to perform tasks in a collaborative environment while moving safely alongside humans in a highly dynamic workspace.

The embodiments described herein relate to robotic vehicles that move autonomously along the ground (herein referred to as an "autonomous ground vehicle" or "AGV"). Although the various embodiments are directed to unmanned robots that are autonomous ground vehicles that autonomously move along the ground, other embodiments may be incorporated in other vehicles that travel in air, in space, in water, or the like, where direct-perception navigation is possible. The AGVs described herein are "unmanned," in that no humans are on board this ground vehicle. According to embodiments, the autonomous robotic vehicle includes a vehicle management system that uses sensors and computational resources to safely travel along the ground in an environment including dynamic obstacles or objects (e.g., humans).

In contrast, conventional autonomous robots are limited to use in environments having only static or quasi-static objects. Due to safety concerns, conventional autonomous robots are not deployed in an environment including humans. Instead, in those environments (e.g., a fulfillment facility), movement of goods and materials (e.g., inventory)

is performed by humans, human-operated vehicles, and conveyors.

As described above, the embodiments described herein overcome the problems and challenges set forth above with respect to detecting a dynamic object and performing motion planning for the autonomous robotic vehicle in view of a predicted trajectory of the detected object. The embodiments of the autonomous robotic vehicle include a vehicle management system with obstacle sense and avoid capabilities to re-plan the motion of the autonomous robotic vehicle through complex environments while maintaining assured safety around people. The vehicle management system enables an autonomous shift between slow and cautious behavior in highly dynamic and crowded areas to fast and efficient behavior in open spaces where higher speeds are safe. The vehicle management system uses vehicle behavior and signaling to convey vehicle intentions and inspire confidence from the nearby human bystanders and operators, to enable close operation and collaboration with humans.

The autonomous robotic vehicle uses sensor data collected by one or more sensors to generate an interpretation of a surrounding environment. The environment interpretation includes localization and mapping of the autonomous robotic vehicle to generate map data and vehicle pose estimation data (collectively referred to as the "autonomous robotic vehicle location data"). The environment interpretation also includes object recognition and tracking to generate detected object data. The detected object data is analyzed to determine predicted trajectory data corresponding to the detected dynamic object. The autonomous robotic vehicle location data and the predicted trajectory data are analyzed by a path and trajectory planning module to generate trajectory data for the autonomous robotic vehicle and enable object avoidance. As a result, the embodiments of the autonomous robotic vehicle and vehicle management system described herein can navigate in an environment including dynamically moving objects in a safe, efficient, and reliable manner. Thus, aspects of the embodiments described herein can overcome the problems and deficiencies of conventional autonomous robotic vehicles that prohibit and forcibly interrupt motion of the robotic vehicle in response to detection of a moving object.

The various embodiments described below are directed to a type of autonomous robotic vehicle for traveling on the ground, namely a direct-perception AGV. The embodiments of the direct-perception AGV provide a solution that can be employed in an uncertainty environment including one or more unknown dynamic obstacles. The autonomous robotic vehicle can predict the motion of a dynamic object. In an embodiment, the predicted motion can represent a change in position of an object (e.g., a human) over time, and can be characterized by parameters such as trajectory, pose, displacement, distance, velocity, acceleration, time, and speed.

FIG. 1 is a block diagram of a vehicle management system 100 to manage operation and motion of an autonomous robotic vehicle in an environment including one or more dynamic objects (e.g., humans), according to one embodiment. The vehicle management system 100 is employed on an autonomous robotic vehicle such as an autonomous ground vehicle (AGV) 101 including one or more delivery containers 102. The AGV 101 can include one or more memory devices 130, a drive system 115 of one or more actuators, and one or more processing device 110 coupled to the one or more memory devices 130 and the drive system 115. According to embodiments, the AGV 101 can include additional components, such as data storage, a Global Positioning System (GPS) unit, radios, antennas, or the like. The radios may include cellular radios, wireless local area network (WLAN) radios, personal area network (PAN) radios, or the like.

The AGV 101 includes one or more sensors 150 configured to detect, capture, and collect data associated with an environment of the AGV 101. The sensors 114 may include one or more cameras of one or more types, accelerometers, inertial sensors, temperature sensors, proximity sensors, infrared sensors, pressure sensors, light sensors, ultrasonic sensors, humidity sensors, wheel encoders, imaging/scanning light detection and ranging (LIDAR) sensor, an RGB-D sensor, one dimensional ranging sensors such as a laser/light emitting diode (LED) time-of-flight sensor/ranger, an ultrasonic sensor/ranger, a reflectivity intensity sensor/ranger, or a set of sensors configured to act as a triangulation sensor/ranger; two dimensional image capturing sensors or cameras including visible light cameras and/or infrared/thermal cameras; two dimensional ranging sensors such as a scanning or other suitable light pulse laser ranging sensors; and/or three dimensional imagers such as the LIDAR sensor, a solid-state LIDAR, a time-of-flight camera(s), stereo cameras both active and passive, structured light cameras, or radio detection and ranging (Radar) transmitters and receivers.

The one or more motorized actuators of the drive system 115 can include motors to drive wheels, tread systems, or other mechanisms to provide linear and rotational movements of the AGV 101. It should be noted that although one processing device 120 is illustrated, in other embodiments, multiple processing devices can be used. In other embodiments, the processing device 120 includes multiple execution threads that can perform the various operations described herein. In one system, an AGV 101 can include actuators, one or more memory devices, and one or more processing devices, where at least one of the processing devices is located on the AGV 101.

In one embodiment, the memory device 130 stores instructions of a sensor module 102, a path an trajectory planning module 104, a motion controller 106, a safety management controller 108, and an environment interpretation module 110 for managing the motion of the AGV 101 in an environment including one or more dynamically-moving objects (e.g., humans). Additional details of the sensor module 102, the path and trajectory planning module 104, the motion controller 106, the safety management controller 108, and the environment interpretation module 110 are described in more detail below.

During operation, the processing device 120 executes the sensor module 102, the path and trajectory planning module 104, the motion controller 106, the safety management controller 108, and the environment interpretation module 110. In an embodiment, the one or more sensors 150 capture data relating to the environment (e.g., surroundings including static, quasi-static, and dynamic objects) of the AGV 101. The sensors 150 provide the sensor data to sensor module 102 of the vehicle management system 100. The sensor module 102 processes the raw sensor data corresponding to the AGV 101 and environment and provides the sensor data to the environment interpretation module 110.

According to embodiments, the environment interpretation module 110 includes a localization and mapping module 111, an object recognition and tracking module 112, and a moving object trajectory prediction module 113. In an embodiment, the localization and mapping module 111 receives the sensor data and combines the sensor data with historical data associated with the environment, the AGV 101, one or more known objects, etc. In an embodiment, the localization and mapping module 111 analyzes the sensor data and the historical data to determine a location of the AGV 101 (i.e., localization). In an embodiment, the localization and mapping module 111 further generate a map of the environment. In an embodiment, the localization and mapping module 111 perform simultaneous localization and mapping (also referred to as "SLAM").

In an embodiment, the object recognition and tracking module 112 of the environment interpretation module 110 detects one or more obstacles within the environment and tracks the detected obstacles (e.g., objects) over time. In an embodiment, the moving object trajectory prediction module 113 of the environment interpretation module 110 identifies one or more moving objects from the detected obstacles and generates a predicted (e.g., future) trajectory of the moving objects. In an embodiment, the moving object trajectory prediction module 113 generates a set of information including the AGV 101 information (e.g., the localization and mapping information) and the moving object trajectory prediction information (collectively referred to as "environment information").

In an embodiment, the path and trajectory planning module 104 processes the environment information to plan a high-level path to accomplish a current task assigned to the AGV 101 (e.g., "move from point A to point B") and generate a trajectory of desired positions and times that the AGV 101 can follow to move along the planned path (herein referred to as "trajectory information"). In an embodiment, the path and trajectory planning module 104 provides the trajectory information associated with the AGV 101 to the motion controller 106. The motion controller 106 converts the trajectory information into one or more drive commands or instructions (e.g., velocity commands) to be provided to the drive system 115.

In an embodiment, the vehicle management system 100 includes a safety management controller 108 configured to receive the sensor data from the sensor module 102 and apply one or more safety protocols to ensure the AGV 101 does not collide with any detected objects. In one embodiment, the safety management controller 108 can generate, based on the sensor data, instructions to stop the AGV 101 and provide the instructions to the motion controller 106. In an embodiment, the instructions to stop the AGV 101 (also referred to as "safety stop" instructions) can be provided to the drive system 115 for execution to avoid a potential collision with an object detected based on the sensor data.

Figure 2:
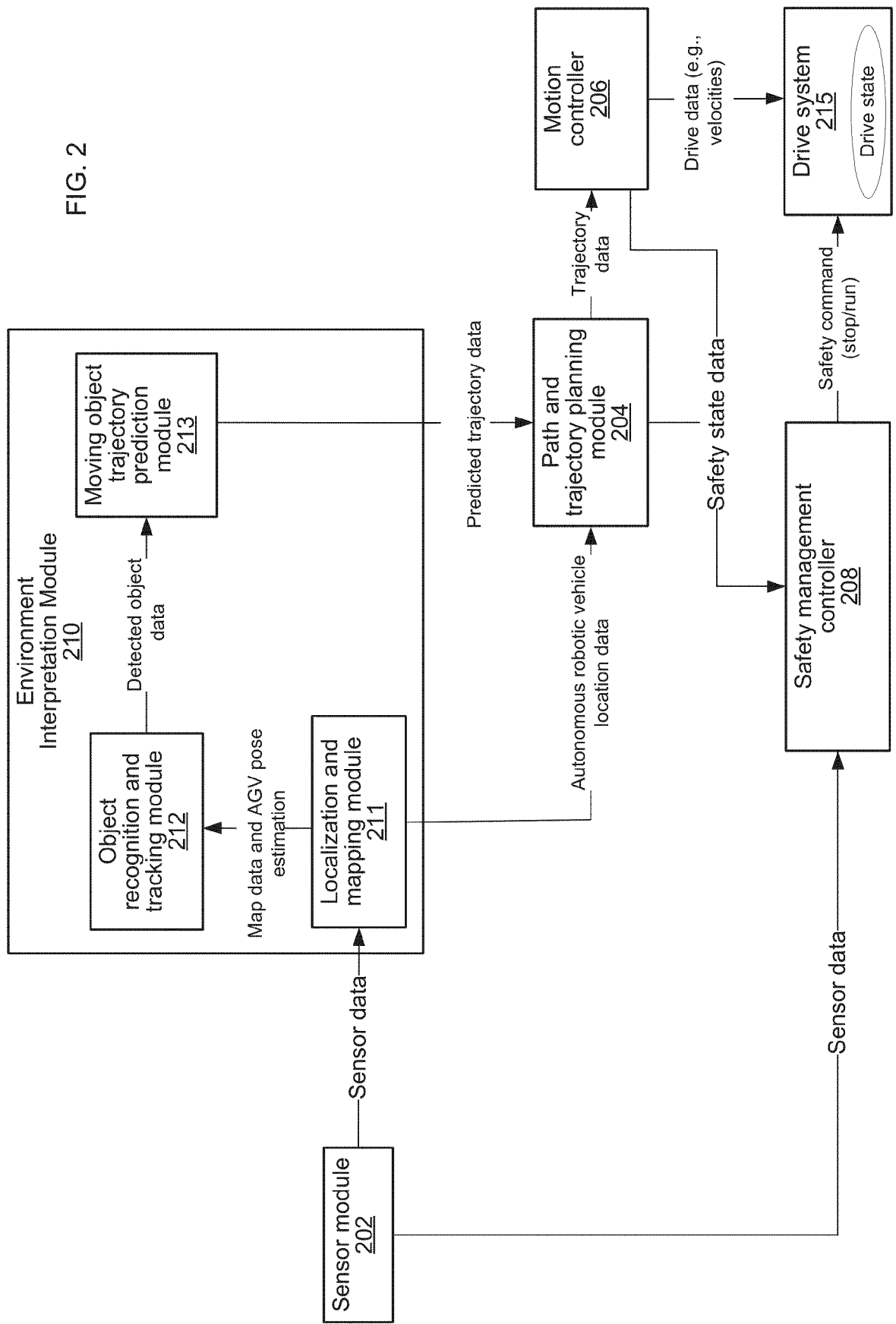
FIG. 2 is a block diagram illustrating a vehicle management system including onboard software components and corresponding data flows, according to one embodiment.

FIG. 2 illustrates a diagram including a vehicle management system 200 and corresponding data flow resulting from the operation thereof. As shown in FIG. 2, the vehicle management system 200 can include a sensor module 202, an environment interpretation module 210, a path and trajectory planning module 204, a motion controller 206 and a safety management controller 208. In an embodiment, the sensor module 202 receives and processes sensor data collected and captured by one or more sensors of an AGV. The sensor module 202 can provide the sensor data to the environment interpretation module 210 and the safety management controller 208.

In an embodiment, if the sensor data indicates a potential threat (e.g., an impending collision with an object) to the AGV, the safety management controller 208 can generate a safety stop instruction and send the safety stop instruction to the motion controller 206. In an embodiment, the safety management controller 208 assesses a threat level associated with the environment of the AGV and potential collisions and sends a corresponding safety command (e.g., a stop or run command) to the drive system 215 of the AGV.

In an embodiment, the environment interpretation module 210 uses the sensor data to generate environment information (e.g., information relating to the localization and mapping of the AGV, information relating to one or more detected objects including a predicted trajectory of one or more dynamic objects, etc.).

In an embodiment, the environment interpretation module 210 includes a localization and mapping module 211, an object recognition and tracking module 212, and a moving object trajectory prediction module 213. The localization and mapping module 211 performs localization and mapping by determining a vehicle state associated with the AGV (e.g., position, orientation, velocity, etc.) within a global frame and map associated with the environment by fusing multiple sensor measurements. In an embodiment, the localization and mapping module 211 builds and refines the global environmental map based on historical and newly collected sensor measurements.

In an embodiment, the localization and mapping module 211 iteratively predicts and evaluates possible trajectories the host AGV can take in a given environment. The localization and mapping module 211 maximizes the expected progress of the AGV while respecting the speed and smoothness preference of the user and minimizing the expected cost of collision.

The object recognition and tracking module 212 performs operations to relating to object detection, tracking, classification, and prediction. In an embodiment, the object recognition and tracking module 212 detects obstacles and classifies the detected objects into categories. For example, if a human passes the AGV, the object recognition and tracking module 212 can mark the human with a bounding box and identify the object as a "Person." In another example, the object recognition and tracking module 212 can detect the presence of a box or crate and identify or classify the object as a "box". Object detection and classification produces an accurate assessment of the environment for use in motion planning for the AGV to produce improved trajectory prediction, movement efficiency, and collision avoidance. For example, it takes into account humans have a higher probability of moving in the immediate future compared to stationary boxes.

The object recognition and tracking module 212 generates the detected object data (e.g., object location data, classification data, etc.) and provides the detected object data to the moving object trajectory prediction module 213. In an embodiment, the moving object trajectory prediction module 213 tracks the human and predicts a trajectory of the human to assist the motion planner in proactively guiding the AGV's movement in the human-populated environment around people. Advantageously, the moving object trajectory prediction module 213 predicts a trajectory of a moving object in the surrounding environment of the AGV. In an embodiment, the moving object trajectory prediction module 213 generates predicted trajectory data corresponding to the detected object (e.g., the human) and provides the predicted trajectory data to a path and trajectory planning module 204.

In an embodiment, based on the environment information, the path and trajectory planning module 204 determines trajectory data for the AGV based at least in part on the predicted trajectory data corresponding to the detected moving object. In an embodiment, the trajectory data accounts for the predicted trajectory data associated with a detected dynamic object to adjust, update, or change the path and trajectory planning of the AGV to avoid collision with the moving object and ensure safe and efficient operation in a dynamic and busy environment. Advantageously, use of the predicted trajectory data by the path and trajectory planning module 204 to perform motion planning for the AGV produces a more predictable and natural human-robot interaction while still enabling efficient navigation in an environment having tight and dynamic constraints.

In an embodiment, the path and trajectory planning module 204 receives location data associate with the AGV from the localization and mapping module 211. In an embodiment, the AGV location data includes coordinates identifying a location of the AGV as determined by the localization and mapping module 211. In an embodiment, the path and trajectory planning module 204 uses both the AGV location data and the predicted trajectory data corresponding to the moving object to generate trajectory data for the AGV.

In an embodiment, the path and trajectory planning module 204 provides the trajectory data to the motion controller 206. In accordance with at least one embodiment, the motion controller 206 may be configured to generate drive data corresponding to a local travel plan or path for completing a task within the environment in view of the detected moving object. The local travel plan or path may include instructions for steering and a speed to utilize for one or more propulsion components of the drive system 215 of the automatic robotic vehicle. In embodiments, the motion controller 206 uses the trajectory data based on the AGV location data and the predicted trajectory data to generate the drive data corresponding to the updated or new travel plan that includes avoiding or navigating around the detected moving object that is within a local planning zone and a current travel plan associate with the AGV. The new travel plan may include the drive data including instructions to the drive system 215 for updating a steering, direction, and speed for the autonomous mobile robot to utilize while navigating the facility or workspace to complete a task. In some embodiments, the new travel plan may include instructions for centering the autonomous mobile robot between the identified physical dimensions surrounding the object and a wall or barrier of the facility or workspace. In accordance with at least one embodiment, the new travel plan may include instructions for centering the AGV between the identified object/obstacle in the local planning zone according to a distance of a safety zone at least partially surrounding the AGV.

In accordance with at least one embodiment, the safety management controller 208 may be configured to generate and maintain a safety zone around the AGV using data captured by the sensor module 204. In embodiments, the sensor data may include data collected by one or more safety sensors configured to capture data up to a certain distance around the AGV that is less than the distance captured by one or more other sensors coupled to the sensor module 202. In accordance with at least one embodiment, the size of the safety zone may be less than that of the local planning zone generated by the motion controller 206. The safety management controller 208 may be configured to identify or detect an object or obstacle penetrating the safety zone based on the data captured by the safety sensors and provide a safety command (e.g., stop or run instructions) to the drive system 215. In an embodiment, the path and trajectory planning module 204 and the motion controller 206 provide safety state data to the safety management controller 208 for use with the sensor data to determine the safety command. For example, in an embodiment, the safety management controller 208 may maintain a safety zone defining a zone around the AGV. In an embodiment, the safety management controller 208 provides instructions to stop the AGV upon identifying an object or obstacle within the safety zone. In an embodiment, the size and shape of the safety zone is determined based at least in part on current speed of the AGV which in turn is determined by the motion controller 206.

In an embodiment, the safety management controller 208 may dynamically update the size of the safety zone based on the safety state data obtained from the motion controller 206 and path and trajectory planning module 204. In an embodiment, the motion controller 206 produces drive data to enable the AGV to travel, for example, a slower speed, past crowded, congested, or otherwise non-clear paths of the environment based on the trajectory data with a failsafe provided by the safety management controller 208 configured to override any propulsion or steering that results in the object or obstacle penetrating the safety zone. In an embodiment, the safety management controller 208 can respond to objects that move unexpectedly into the path of the AGV by detecting the object penetrating the safety zone and providing instructions to the drive system 215 to cease propulsion of the AGV. For example, a person opening a closed door and stepping directly into the path of the autonomous robotic vehicle from a blind spot.

According to embodiments, a modular mobility platform (e.g., drive unit components including a chassis and motion actuators (motors) allowing movement of the platform) for safe operation in a dynamic environment is described. The modular mobility platform (also referred to as a "modular AGV") also includes one or more sensing systems to detect obstacles in a dynamic environment. In an embodiment, the modular AGV is configured to navigate using autonomous navigation sensors. This enables the modular AGV to move around an unmarked floor (e.g., a in an environment that does not include a floor labeled in a grid with fiducials that are used to navigate). The modular AGV is configured to slow and avoid obstacles as the modular AGV detects the obstacles. In an embodiment, a centralized, network mission planning computer system can be used to issue directions based on endpoints or waypoints to the modular AGV.

In an embodiment, the modular AGV contains one or more safety management controllers to perform safety functions. An example safety function performed by the one or more safety management controllers includes a "safe stop 1" or "SS1" function that engages a controlled stop of the motors of the modular AGV and removes power from the motors to ensure no torque can be exerted. In an embodiment, the modular AGV is configured to implement a time-controlled SS1 function (also referred to as "SS1-t"), where the modular AGV activates a safe torque off (STO) function after a fixed amount of time. In an embodiment, if the velocity exceeds a required envelope during deceleration, the safety management controller of the modular AGV can immediately override the motion control system and removes power from the motors.

Another example safety function performed by the one or more safety management controllers of the modular AGV is a "safe stop 2" or "SS2" function that engages a controlled stop of the motors, then activates a safe operation stop (SOS) function. The SOS function is a safety function that ensures the modular AGV maintains its position on the floor, with power to the motors allowing the modular AGV to stay in the same place on an incline. In an embodiment, if a position limit is exceeded, power can be removed from the motors and the drive glides to a stop. In an embodiment, the modular AGV can implements a time-controller SS2 function.

In an embodiment, the one or more safety management controllers of the modular AGV can perform a safe limited speed (SLS) function that ensures the modular AGV speed does not exceed a predetermined threshold value (e.g., 0.25 m/s). In an embodiment, if the predetermined threshold value is exceeded, the modular AGV activates the STO function.

In an embodiment, the one or more safety management controllers can be configured to perform one or more of the safety operations (e.g., SS2, SS1, SOS, STO, SLS, etc.), as appropriate, in response to detection of a human approaching the modular AGV within a calculated range. In an embodiment, the one or more safety management controllers can imposes failsafe on diagnostic failure or when a human presses a local emergency stop (E stop) button.

In an embodiment, the one or more safety management modules of the modular AGV are configured to perform operations based on safety data received from one or more safety sensors. A safety sensor includes a device or set of devices that takes one or multiple inputs from the environment or attached equipment and produces one or more safety-relevant outputs. For example, the safety sensor can include a stereo camera contains two cameras (a set of devices) configured to observe the area in front of the modular AGV (e.g., collect inputs), and uses a discrete microcontroller to process the data and perform diagnostics to generate a safety-relevant output. In an embodiment, one or more sensors of the modular AGV are configured for reuse and can be certified as electro-sensitive protective equipment (ESPE) sensors. In an embodiment, one or more of the sensors may not be modularized, such as, for example, one or more motor encoders integrated into the base mobility platform.

In an embodiment, the modular AGV includes an autonomous mobility module (AMM) integrated with a drive system to enable advanced vehicle-level autonomy. The modular AGR is a drive unit configured to operate in an uncontained/uncontrolled environment (i.e., outside of a controlled access fenced area) safely around bystanders and navigate autonomously through structured and unstructured environments. The modular AGV is configured to pick up, move and place materials while navigating in close proximity to associates without the use of a physical barrier to separate the vehicle from the human workers.

Figure 3:
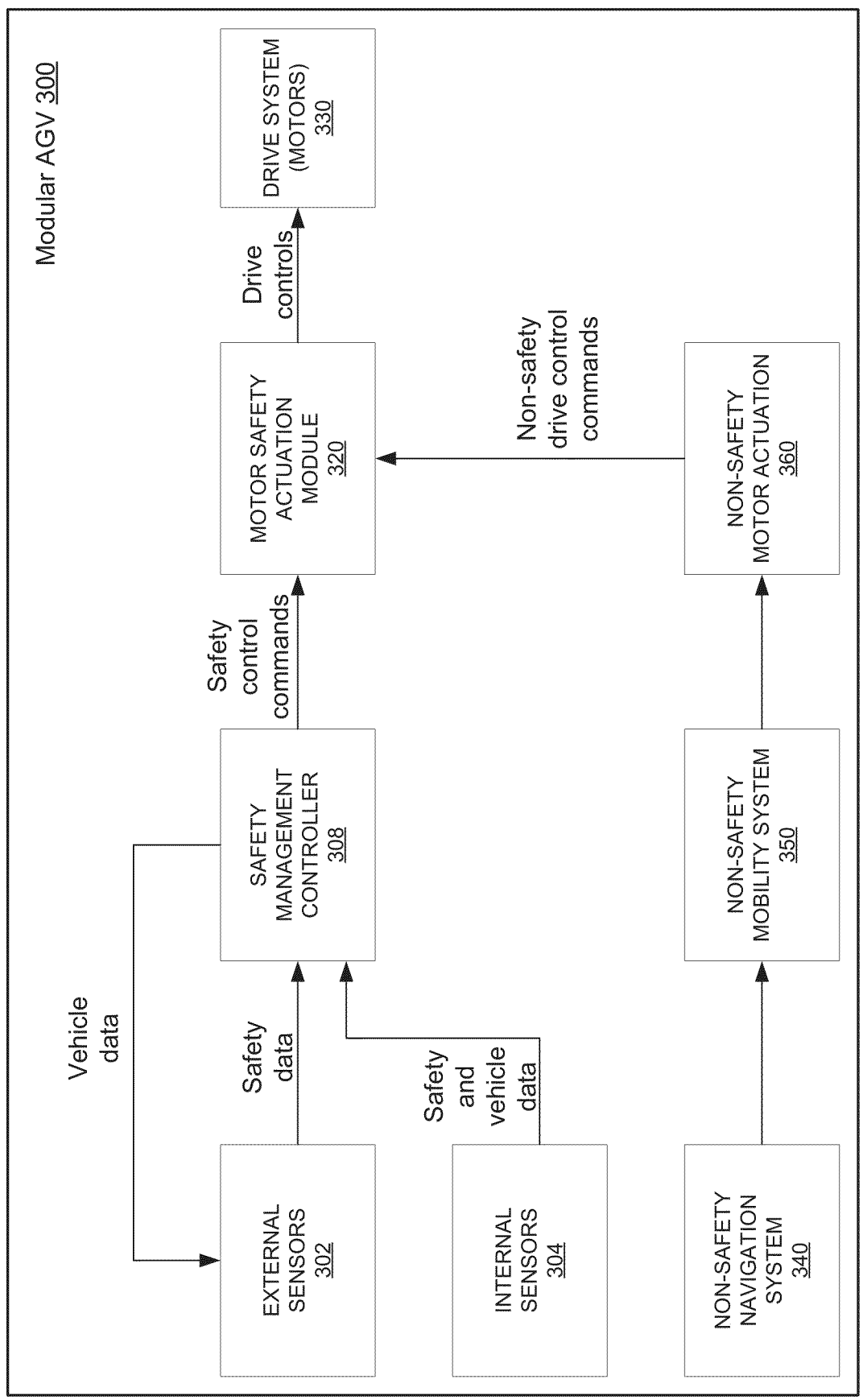
FIG. 3 is a diagram illustrating an example data flow of a modular autonomous ground vehicle including a safety system and a non-safety system, according to one embodiment.

FIG. 3 illustrates an example data flow corresponding to components of a modular AGV 300, according to embodiments of the present disclosure. The modular AGV 300 includes a dedicated safety system, referred to as the safety management controller 308 (or Drive Unit Safety Controller (DUSC)). In an embodiment, the safety management controller 308 of the modular AGV 300 controls the safety functions to address movement of the drive system 330.

In an embodiment, the modular AGV includes a non-safety system and a safety system. In an embodiment, the autonomous navigation system (ANS) is the non-safety system that navigates an assigned route, for example, using guidance provided by the centralized vehicle fleet coordination system. In an embodiment, the ANS can detect obstacles in its path (and those dynamic obstacles to the side that may enter its path) and perform rapid re-planning of its path and velocity profile to avoid those obstacles. In an embodiment, the ANS can utilize sophisticated localization, mapping, perception, and planning algorithms. In an embodiment, the modular AGV includes a safety system, also referred to as an autonomous sensor controller (ASC). The ASC can operate as an independent, simple, and deterministic subsystem. In an embodiment, this subsystem can receive its own inputs from obstacle detecting sensors to determine distance to obstacles. The ASC can read velocity data from a safety management controller (e.g., safety management controller 308 of FIG. 3). For example, the ASC can calculate a safety stop zone, based upon the modular AGV velocity. If an object is detected within the ASC safety stop zone, the ASC can set its safety outputs to stop condition. In an embodiment, the safety management controller is configured to read this state and stop the modular AGV.

Advantageously, the modular AGV including the ANS and ASC subsystems enables a high-performance, complex, non-safety-certified autonomous navigation capability to operate the modular AGV while employing a separate, dedicated subsystem to ensure bystander safety.

In an embodiment, the modular AGV 300 includes a safety subsystem (e.g., an ASC subsystem including a safety management controller 308 and motor safety actuation module 320) and non-safety subsystem (e.g., an ANS subsystem including a non-safety navigation system 340, non-safety mobility system 350 (e.g., MEA), and a non-safety motor actuation 350 (e.g., an ARIMA motor controller)) to generate non-safety drive control commands to control operation of the drive system 330 (e.g., one or more motors of the modular AGV 300). In an embodiment, the non-safety components are responsible for detecting and navigating around objects along the nominal path of the modular AGV 300 by issuing non-safety drive control commands to the motor safety actuation module 320 to produce drive controls for the drive system 330. In an embodiment, the safety components are responsible for detecting objects in or near the path of the modular AGV 300, identifying one or more corresponding safety functions that are necessary in view of safety data and vehicle data received from the external sensors 302 and internal sensors 304, and issuing one or more safety control commands to the motor safety actuation module 320 to produce drive controls for the drive system 330.

In an embodiment, the safety management controller 308 is configured to feed vehicle data back into the external safety sensors 302 to adjust the safety state of the modular AGV 300. For example, when the modular AGV 300 is moving at full speed, a forward-looking external sensor 302 can trigger a stop at a greater range than when the drive is moving at slow speed. To enable allow the external sensor 302 to make that decision, the safety management controller 308 can report the velocity of the modular AGV 300 (i.e., the vehicle data) to the external sensor 302, and the external sensor 302 can return a triggered / not triggered status back to the safety management controller 308, thereby reducing the processing burden on the safety management controller 308.

In an embodiment, the safety management controller 308 can collect safety data from one or more external sensors 302. The safety management controller 308 also collects safety and vehicle data from one or more internal sensors 304 (e.g., an E-stop sensor, a SRBRS sensor, encoders, etc.). In an embodiment, the safety management controller 308 determines an appropriate safety function or functions based on the collected safety and vehicle data and provides one or more safety controls to a motor safety actuation module 320.

For example, the safety management controller 308 can determine an SLS function is to be executed in view of the one or more sensors 302, 304 collecting data indicating a low speed is required. In another example, the safety management controller 308 can determine an SLS function is to be executed in view of the one or more sensors 302, 304 collecting data indicating the drive system 330 should stop immediately. In an embodiment, the safety management controller 308 can generate safety controls indicating that the SS2 function transition to an SOS function (powered and monitored stop) once the drive system 330 achieves the stop condition. In an embodiment, the safety management controller 308 can issue safety controls associated with an STO function in response to certain diagnostic failures or in response to actuation of an E-stop button.

In an embodiment, during an SS2 event, the safety management controller 308 monitor the vehicle controller, commanding one or more motor controllers (ARIMAs) to initiate the safe stop. Once stopped, the drive system 330 remains in an SOS state until the sensors 302, 304 indicate that the safety condition can be exited. In the event that stopping performance fails to meet the expected deceleration profile, the safety management controller 308 can transition to a STO state by generating a safety control to the motor safety actuation module 320 to execute an STO function.

Figure 4:
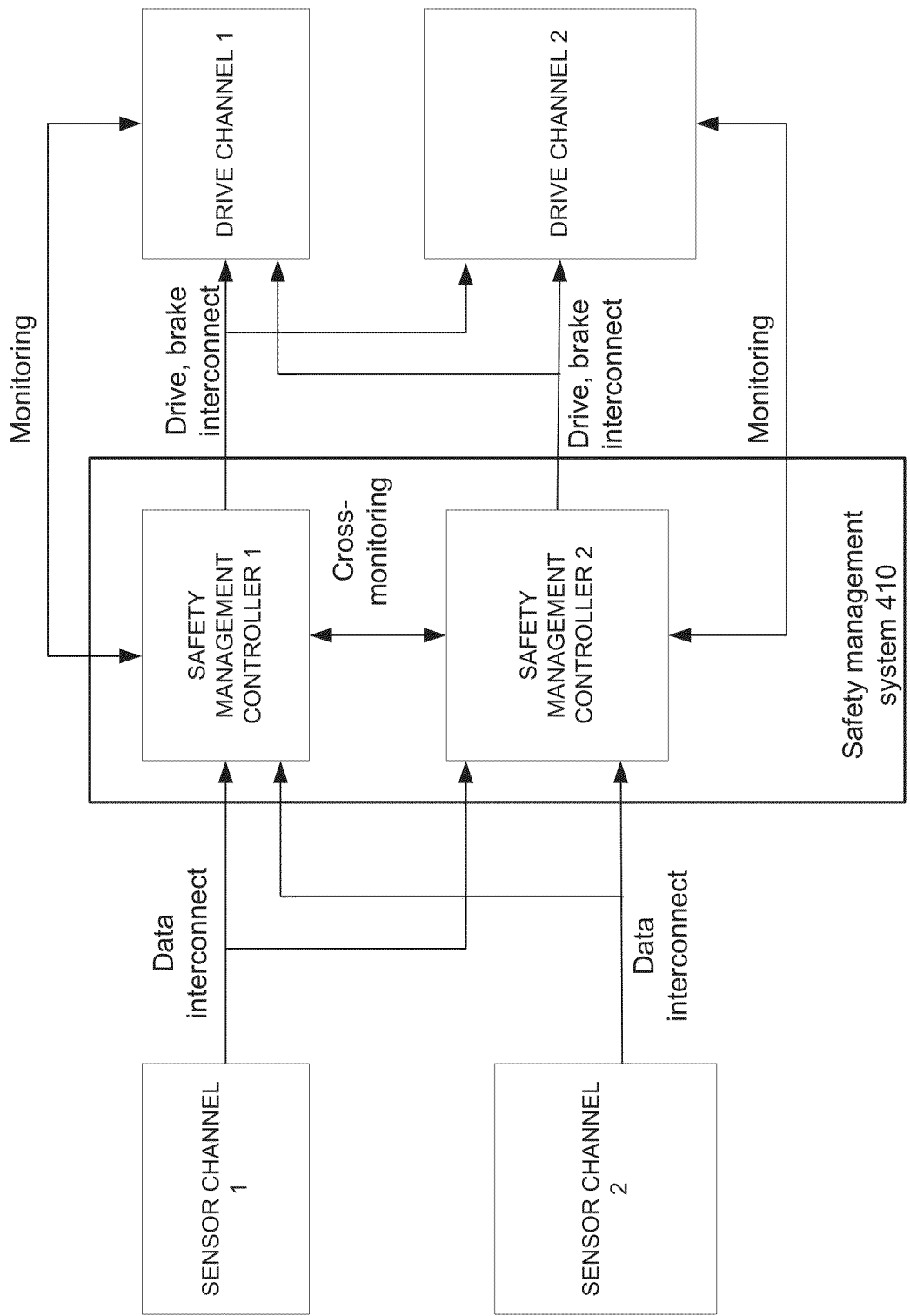
FIG. 4 is a diagram illustrating an example data flow of a modular autonomous ground vehicle including a safety system with multiple safety management controllers, according to one embodiment.

FIG. 4 illustrates an example modular AGV including a safety management system 410 including multiple microcontrollers (e.g., safety management controller 1 and safety management controller 2) performing cross-checking, wherein each safety management controller is configured to initiate the one or more safety functions independently. As shown in the example architecture, safety management controller 1 and safety management controller 2 have data interconnects with multiple sensor channels (e.g., sensor channel 1 and sensor channel 2). In an embodiment, the multiple safety management controllers of the safety management system 410 can employ cross-checking of the safety management logic. In an example, the safety management controllers can employ a voting model based on the due sensor inputs received from sensor channel 1 and sensor channel 2. In an embodiment, the sensor channel channels corresponding to E-stop switches configured as double pole switches so the poles can be compared to each other. In an embodiment, the safety management controllers 1, 2 have drives, brake interconnects with multiple drive channels (e.g., drive channel 1, drive channel 2). In an embodiment, the multiple drive channels are configured to compare encoders to Hall Effect sensors for redundancy and diversity. In an embodiment, the safety management system 410 can use multiple camera inputs that observe the same field of view and interpret the data independently.

In an embodiment, the dual safety management controllers can perform cross-checking on each other, and are each configured to actuate the motor safety functions via the drive, brake interconnects with the multiple drive channels, as shown in FIG. 4. In an embodiment, the multiple safety management controllers are configured to override non-safety motion commands by disabling the motor drivers and actuating an electronic brake.

FIG. 5 illustrates an example safety management architecture of a modular AGV, according to embodiments of the present disclosure. As shown, a safety management controller 510 configured to manage the logic of the safety functions based on safety data received from one or more sensors (e.g., one or more external sensors, wheel speed sensors, front and rear e-stop sensors/actuators, SRBRS, etc.). In an embodiment, the safety management controller 510 generates one or more safety actuation commands to provide to the drive system (e.g., motor controller boards such as ARIMA)

In an embodiment, the safety management controller 510 is configured to generate safety actuation commands corresponding to the safety functions identified in Table 1.

TABLE 1

Safety Functions

| Safety Function | Safe Behavior |
|---|---|
| SS2 | Mobility platform initiates deceleration profile to stop, while the safety management controller enforces overspeed limits. The safety management controller removes power from the motors on failure to stay within the deceleration profile. The safety management controller transitions to SOS following successful deceleration to stop. |
| SOS | The mobility platform maintains the position of the modular AGV. If the position is changed outside certain limits, the safety management controller removes power from the motors. The safety management controller can stays in SOS indefinitely as long as the modular AGV position is maintained. |
| SS1 | Mobility platform initiates deceleration profile to stop, while the safety management controller enforces overspeed limits. The safety management controller removes power from the motors on failure to stay within the deceleration profile. The safety management controller transitions to STO on completion of stop or expiration of timer. |
| SLS | Mobility platform initiates deceleration profile to limited speed, while the safety management controller enforces overspeed limits The safety management controller removes power from the motors on failure to stay within the deceleration profile. |
| | Once the mobility platform has decelerated to the speed limit, the safety management controller continues to enforce overspeed limits. The safety management controller removes power from the motors on failure to stay within the limited speed. The safety management controller can stay in SLS indefinitely as long as motion remains within the speed limits. |
| STO | The safety management controller removes power from the gate drivers so there is no ability of the modular AGV to command motion, and locks out further modular AGV movement commands. |

In an embodiment, the safety management controller 510 is configured to trigger the safety functions based on its internal sensors and diagnostics. For example, Table 2 illustrates example events associated with the modular AGV and the corresponding safety function that is triggered by the safety management controller 510.

TABLE 1

Safety Functions Triggers from the internal sensors of the modular AGV

| Modular AGV Event Detected | Safety Function Triggered |
|---|---|
| SRBRS Stop | SS2 / SOS |
| SRBRS Slow | SLS |
| Diagnostic fault cases | SS1 / STO |
| Local E-Stop button is actuated | STO |

In an embodiment, as shown in FIG. 5, multiple safety inputs from the multiple external sensors can be integrated to trigger safety functions. In an embodiment, a protocol is established between the external sensors and the safety management controller 510 to enable each external sensor to specify a stop or slow condition. In an embodiment, the safety management controller 510 can trigger execution of SS2 or SLS, lifting the motion restriction when the sensor indicates the condition has changed. In an embodiment, the one or more safety sensors can also trigger STO or SS1 in case of fault conditions.

In an embodiment, the interface between the external sensors and the safety management controller 510 can be an addressable serial bus, using suitable methods (e.g., black channel methods) to maintain data integrity and timeliness. In an embodiment, the modular AGV can send speed information to the external sensors so the sensors can adjust a calculation of a safety range associated with the modular AGV. In an embodiment, a sensor can send the desired state based on what it detects: stop, slow, fault, or normal operation. In an embodiment, the modular AGV can react to external sensor inputs using common safety functions, as described in detail above.

In an embodiment, reaction time of the safety management controller 510 can include elapsed time from the event occurring until completion of the safety reaction, e.g., stopping or slowing the drive system, to the state change within the safety management controller 510. In an embodiment, an amount of time for the sensor to detect an event is a first time. The reaction and communication time within the drive system before the drive system changes speed is a second time; and the time required to stop or slow the drive system is a third time. Therefore the overall sensor and logic design including the aforementioned processing time and communication speeds can be taken into account when selecting sensor range. Table 3 provides example external sensor initiation events and the corresponding safety function executed by the safety management controller 510, according to embodiments.

TABLE 2

| Safety Function Triggers from the External Sensors | |
|---|---|
| External Sensor Initiation | Safety Function |
| Object detected in vehicle safety zone | SS2 / SOS |
| Object detected in vehicle safety zone | SLS |
| Diagnostic fault cases | SS1 / STO |

In an embodiment, the modular AGV is configured to perform advanced sensing using one or more functions to provide different sensing modalities, splitting the computational load of similar sensing modalities, providing redundant sensing, etc. In an embodiment, the advanced sensing can be used by the safety management controller to enable Safety (SIL2-supporting) Obstacle Detection as well as other potential safety related functions such as crash detection, vehicle tilt detection, payload presence detection, etc. The advanced sensing functions can be used by the ANS to enable environment perception, localization, and obstacle detection.

In an embodiment, the advanced sensing component (ASC) for Safety (SIL2-Supporting) Obstacle Detection is divided into two main categories. The first subsystem is a sensing subsystem including, for example, a stereo camera module (e.g., including two cameras working together to determine object distance from visual disparity). The sensing subsystem can include multiple focal plane array (FPA) sensors, and a disparity ASIC which outputs depth data.

In an embodiment, the second subsystem is a processing back end subsystem. In an embodiment, data streams from the sensing subsystem are connected to the processing subsystem. The processing subsystem generates data product from the sensor data and communicate the data to both processors in the safety controller. In order to achieve redundant sensing and processing, advanced sensing add-ons can be incorporated, including the use of multiple passive monochrome stereo camera modules (e.g., three) to achieve a 180 degree horizontal field of view (HFOV) and the use of multiple active IR stereo camera modules (e.g., three active IR stereo camera modules).

In this example, the multiple stereo cameras offer redundant and independent depth data for detecting objects up to, for example, 6.5 meters in front of the modular AGV. In an embodiment, each of the stereo camera/processor sets contain one or more of the following interfaces: high speed serial interfaces (such as Ethernet, MIPI-C, FPD, GMSL), and controller area network (CAN) interfaces. In an embodiment, the CAN interfaces from these cameras/processors are connected to the redundant safety controller processors. The safety controller processors can cross check. The high speed serial interfaces on the camera sets interface to the ANS. In an embodiment, the stereo camera can also support the existence of a high resolution RGB located on the stereo camera headboards. For example, the ASC is configured to detect objects in front of the drive, the size of approximately a 30 mm sphere located 4 meters from the drive with an accuracy of 5 cm. In another example, the ASC is configured to detect objects in a working range having a reflectivity from approximately 10-90%.

In an embodiment, the advanced sensing functions can include payload change sensing (e.g., loss/gain of payload mass), environment specification sensing (e.g., detecting a wheel slip, detecting vehicle tilt above predetermined threshold value, reduced friction in excess of a predetermined threshold value, etc.), special building zone detection using floor or wall engineered landmarks.

In an embodiment, the advanced sensing functions can include forward sensing for obstacle detection. In an embodiment, the forward sensing function includes measuring a range and bearing (or equivalent metric) to human-like objects ahead of the modular AGV. For example, the forward sensing function includes detecting objects of interest up to a predetermined distance away (e.g., 4.0 m away to relate to a required obstacle detection range for the modular AGV operating at a speed of approximately 2.4 m/s with 2.0 m/s/s deceleration and a 100 ms reaction delay due to update rates, transport delay, and computation delay). In an embodiment, the forward sensing function can detect objects of interest down to 0.5 m away with a HFOV of at least 180 degrees to instantiate safety strategy for incoming obstacles from the sides (e.g., blind corners along aisles, intersection crossing). In an embodiment, the forward sensing function can detect objects of interest with an estimated maximum range resolution of approximately 5 cm and a maximum angular resolution of approximately 10 degrees, while providing measurement updates at approximately 40 Hz.

Figure 6A:
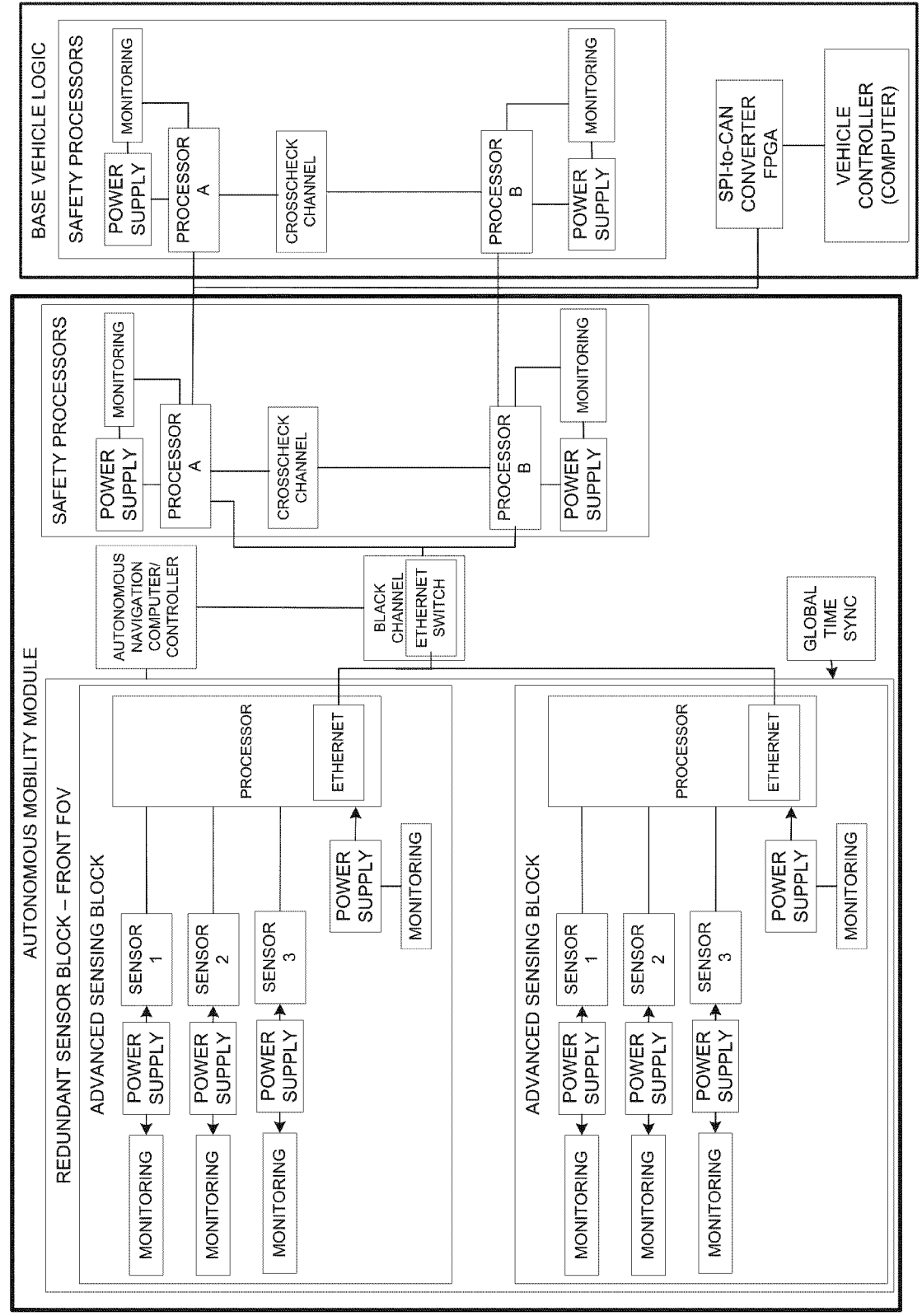
FIGS. 6A and 6B illustrate example architectures of a modular autonomous ground vehicle including front field of view sensors and 360 degree field of view sensors, respectively, according to one embodiment.
Figure 6B:
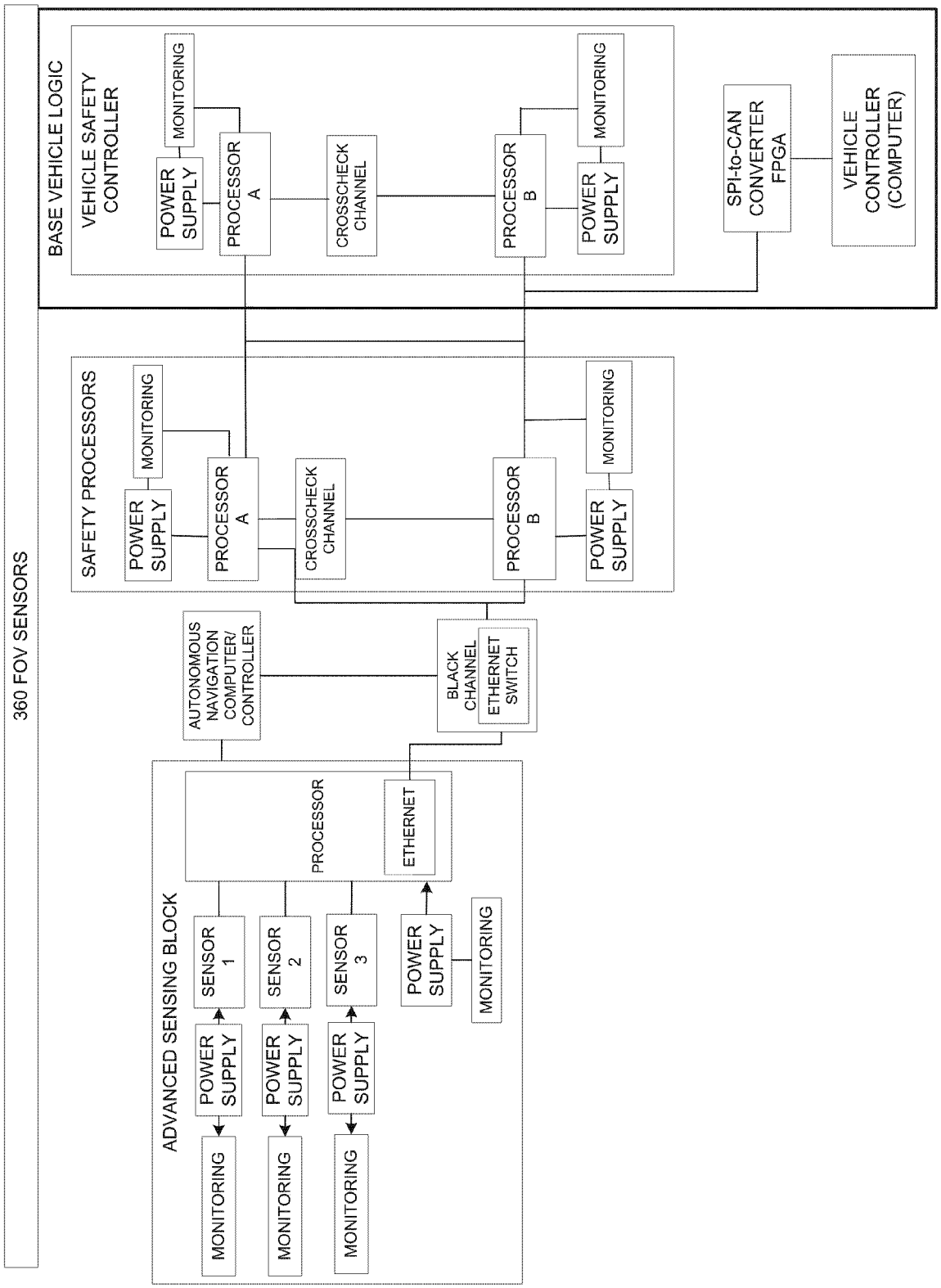

In an embodiment, the advanced sensing functions executable by the modular AGV can include forward sensing for autonomous navigation to support forward obstacle detection and tracking. In an embodiment, the autonomous navigation function can include measuring range and bearing (or an equivalent metric) of obstacles ahead of the modular AGV (i.e., a depth image). For example, the autonomous navigation function can detect objects of interest up to approximately 6.5 m away (e.g., for a modular AGV having a top vehicle speed of 2.2-2.4 m/s to provide approximately 1 second of reaction time to navigate to take action before violating a corresponding safety bubble. In an embodiment, the autonomous navigation function can detect objects of interest down to 0.5 m away with a HFOV of at least 180 degrees to instantiate safety strategy for incoming obstacles from the sides (e.g., blind corners along aisles, intersection crossing). In an embodiment, autonomous navigation function can detect objects of interest with an estimated maximum range resolution of approximately 5 cm and a maximum angular resolution of approximately 5 degrees, while providing measurement updates at approximately 40 Hz. FIG. 6A illustrates an example safety obstacle detection architecture including an example front arrangement of field of view sensors. FIG. 6B illustrates an example surround object detection architecture including an example 360 degree field of view sensor arrangement.

In an embodiment, the modular AGV is configured to execute processes to enable safe and reliable obstacle detection by a safety management controller (e.g., safety management controller 108, 208, 308 of FIGS. 1, 2, and 3, respectively). In an embodiment, the safety management controller collects raw data from one or more sensors (e.g., a 3D sensor) and preprocesses the data to include a minimum amount of data needed for the safety controller to generate a safety decision (e.g., generate a safety control command). In an embodiment, multiple sets of sensors can be used and processed independently to enable the safety management controller to cross-validate sensors with each other to detect both faults in sensor hardware as well as errors in pre-processing algorithms. In an embodiment, although the safety management controller is described as a singular device, it is noted that multiple safety management controllers (e.g., as shown in FIG. 4) can be employed and used to cross-check results with each other.

In an embodiment, the safety management controller receives sensor data from one or more 3D imaging sensors configured to capture a 2D depth map where each pixel is assigned a given depth. As shown in FIG. 7, a point in space is projected onto a 2D image sensor. In an embodiment, camera parameters are determined (e.g., focal length, principal point, distortion coefficients, etc.), and used to deproject a pixel depth back into a point in 3D space. In an embodiment, an equation to determine the deprojection (e.g., translation of a 2D depth image into a 3D point cloud) can be determined based on the technology parameters of the camera (e.g., time of flight or stereo, etc.).

In an embodiment, the raw point cloud generated in FIG. 7 can be large and difficult to process by the safety management controller without adding significant complexity. In an embodiment, the point cloud is downsampled to remove redundant or noisy data. In an embodiment, the point cloud is divided into voxels (e.g., 3D extension of a pixel) and all points within the voxel are averaged to their centroid. Advantageously, this processing removes redundant data as well as smoothing out noise. In an embodiment, the desired size of a voxel is determined, where larger voxels result in a smoother dataset and fewer points and smaller voxels have more detailed features and more points. In an embodiment, the safety management controller is configured to detect the presence of an obstruction and, therefore, sets a voxel size to a minimum desired detection size.

In an embodiment, to further reduce noise, a minimum number of points required per voxel can be determined. After dividing the point cloud into voxels, voxels that do not meet the minimum point threshold can be discarded rather than averaged to the centroid. Because voxels that are further away from the sensor contain fewer points due to the fact that objects that are further away appear smaller (and thus have fewer pixels), the minimum point threshold is dynamic. An example equation to determine an optimized number of points which would lie within a voxel is as follows:

$$N = (Lf/d)^2$$

where L is the side length of the voxel, f is the camera focal length, and d is the distance from the camera plane to the voxel.

In an embodiment, the above equation is derived from computing a number of pixels an L×L plane oriented with a normal vector parallel to the image plane would occupy at distance d from the camera. In an embodiment, this represents an optimized number of points in a voxel assuming perfect conditions, wherein the minimum point threshold is a fraction of this nominal value. In an embodiment, the number of points in the voxel can be selected to meet design constraints based on the system performance tolerance for noisy data. For example, lower thresholds can result in fewer voxels being pruned and higher thresholds can result in a higher level of pruning.

Figure 8:
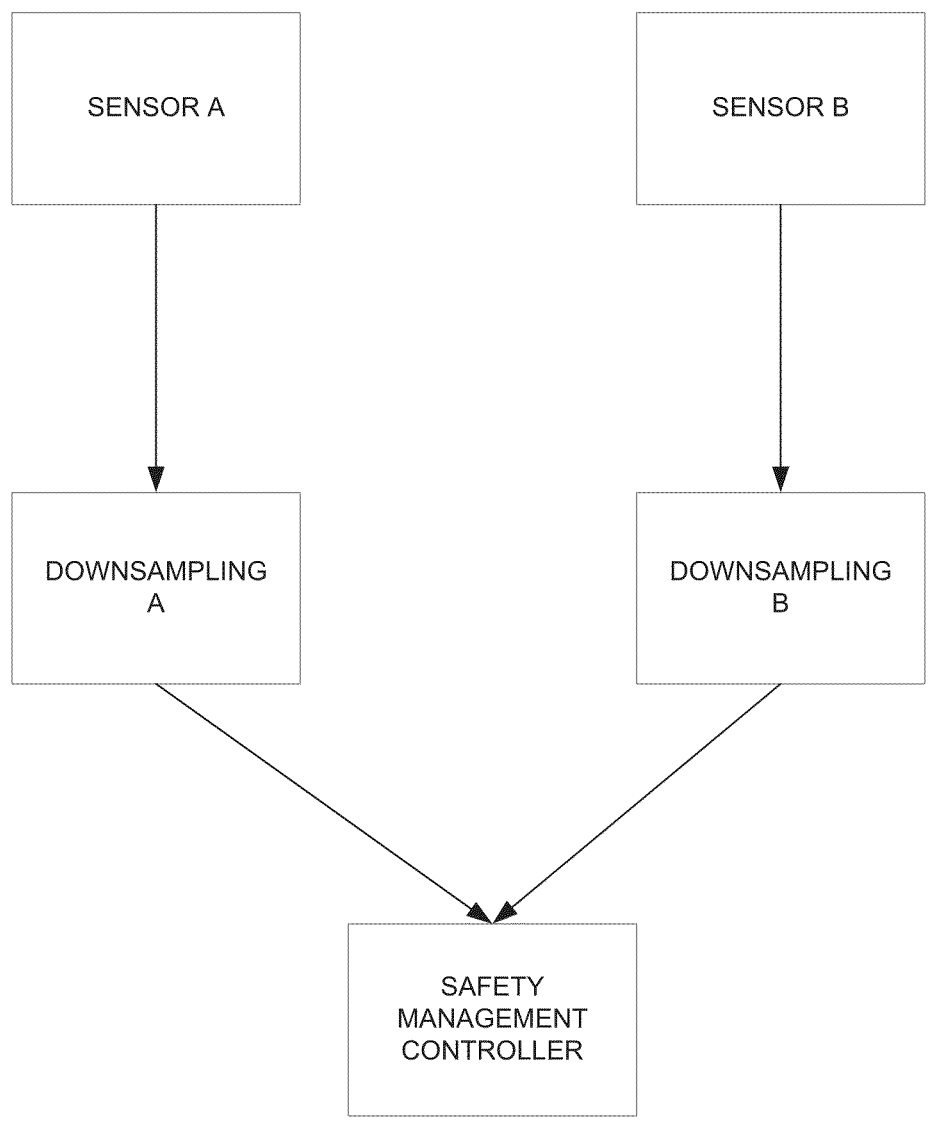
FIG. 8 illustrates an example multiple sensor arrangement including downsampling of sensor data provisioned to a safety management controller, according to one embodiment.

In an embodiment, as illustrated in FIG. 8, the safety management controller is configured to detect errors based on input from multiple sensors (e.g., Sensor A and Sensor B) which are independently downsampled. In an embodiment, as shown in FIG. 8, if both sensors (Sensor A and Sensor B) are observing the same scene, both sensors should output similar point clouds. In an embodiment, any discrepancies between the two sensors can indicate either faults in the sensor itself or in the downsampling process.

In an embodiment, in order to compare the point clouds, the safety management controller collects all data into a same frame of reference. The two sensors cannot be in the exact same physical location so there will always be some offset between the point clouds. In addition, the sensors are unlikely to acquire data at the exact same time so there can be an additional offset along the direction of travel. This offset is dependent on both the velocity of the drive as well as the latency between when the raw sensor acquires an image to when the frame arrives at the safety management controller.

In an embodiment, the mounting offset can be accounted for by either making the safety management controller aware of the mounting location of each sensor or by translating all points after downsampling to a common frame of reference prior to transmission to the safety controller. In an embodiment, the timing offset can be accounted for by preserving a record of previous drive positions over time on the safety controller. If the incoming point cloud data is timestamped, the frame of reference can be corrected by looking up the position of the drive at the time of acquisition.

In an embodiment, with two frames in an equivalent frame of reference, the point clouds can be compared. In an embodiment, the comparison is performed by iterating over each point in cloud A and looking for the nearest neighbor point in cloud B. If the nearest neighbor is within voxel size, then the point in cloud A is corroborated by a point in cloud B. After every point in cloud A has been checked, the process is repeated by iterating over all points in cloud B and looking for a corresponding point in cloud A. In an embodiment, this corroboration can then be scored by dividing the number of corroborated points by the total size of the point cloud. In an embodiment, the overall corroboration score is the minimum of the A-to-B and B-to-A matching.

In an embodiment, identifying the matching points in both directions accounts for an example situation like the following: Suppose cloud A contains a set of points belonging to the floor and cloud B contains points which belong to the floor and a set of points that belong to a box sitting on top of the floor. Checking for corresponding points in cloud B from cloud A can produce a 100% corroboration because the floor exists in both data sets. Going the other direction, looking for a matching point in cloud A for each point in cloud B, results in a poor corroboration because no points in the box have a matching partner in cloud A. If the corroboration score is lower than a selected threshold value (e.g., selected based on desired system performance), then there is inconsistent sensor data and the safety management controller can trigger an immediate stop as at least one of the sensors has likely faulted. Otherwise, it can be determined that both point clouds contain valid and correct data.

In an embodiment, based on the current velocity of the modular AGV, the safety management controller can determine a minimum stopping distance if a full stop were to be requested immediately. The stopping distance forms a region or "safety bubble" around the modular AGV such that if any obstacle were to be located inside the safety bubble, there is a risk of collision that the main navigation controller has not prevented. In an embodiment, the navigation controller operates in such a way that the modular AGV slows down (thus shrinking the safety bubble) as it approaches an obstacle, thereby preventing the object from penetrating the safety bubble. In an embodiment, every time the modular AGV position is updated (e.g., based on monitoring encoder data from the motors), the safety bubble is recomputed and both point clouds are checked for violations and, if any are identified, the safety management triggers an immediate stop.

In an embodiment, the safety management system of the modular AGV is configured to stop the drive if the drive detects an obstacle within an imminent collision area. This collision area is defined by a function of the current velocity of the modular AGV and a current driving mode. Any object detected within this area can trigger a maximum braking of the drive, preventing movement until the object is outside of the collision boundary. The safety management system is intended to be non-intrusive to planning and is configured to affect motion when the autonomy navigation system has a fault.

In an embodiment, the modular AGV is configured to interact with humans and a surrounding environment collaboratively. Accordingly, the modular AGV is configured to move with the flow of human traffic, at high speeds in narrow corridor, and around moveable obstacles. Therefore, the safety management system provides for safety functionality while maintaining minimal impact to the planner's ability to move fluidly with humans.

In an embodiment, the modular AGV is configured to operate on a straight trajectory. In an embodiment, the modular AGV can decelerates both wheels equally such that the modular AGV follows a straight line while stopping. In an embodiment, the modular AGV can operate based on assumptions that all objects are at a constant velocity towards the modular AGV's stopping position and objects can have a small radius based on sensor error.

In an embodiment, a distance (d1) between an obstacle and a stopping distance ($d_{stop}$) of the modular AGV at an initial time can be determined. In an embodiment, the distance ($d_1$) can be determined using the following equation:

$$d_1 = Rp + Rr + vpvr/ar$$

Figure 9:
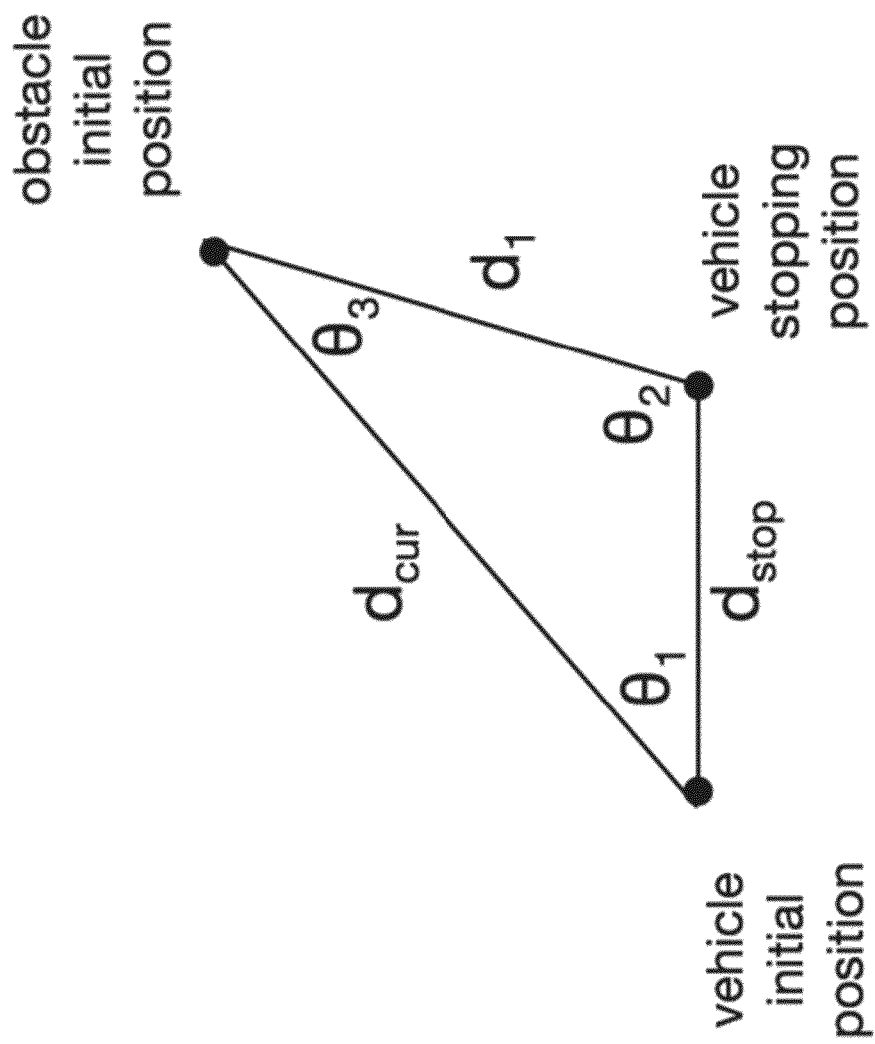
FIG. 9 illustrates an example diagram including safety management processing relating to an autonomous ground vehicle executing a turning function in the presence of a detected obstacle, according to one embodiment.

FIG. 9 illustrates an example diagram including an initial position of the modular AGV (the vehicle initial position), a stopping position of the modular AGV (the vehicle stopping position) and an initial position of the obstacle (the obstacle initial position). FIG. 9 illustrates the relationship between the distance ($d_1$), the obstacle's current distance from the modular AGV ($d_{cur}$), and the modular AGV's stopping distance ($d_{stop}$).

In an embodiment, the Law of Sines can be applied to aforementioned distances, as follows:

$$\frac{d_1}{\sin\theta_1} = \frac{d_{cur}}{\sin\theta_2} = \frac{d_{stop}}{\sin\theta_3}$$

$$\theta_3 = \arcsin\left(\frac{d_{stop}}{d_1}\sin\theta_1\right)$$

$$\theta_2 = \pi - \theta_1 - \theta_3$$

$$d_{cur} = \frac{d_1 \sin\theta_2}{\sin\theta_1}$$

In an embodiment, the modular AGV can determine Cartesian coordinates ($x_p$, $y_p$) of the obstacle at the initial time, as follows:

$$x_p = d_{cur}\cos\theta_1$$

$$y_p = d_{cur}\sin\theta_1$$

In an embodiment, the modular AGV can determine a safety bubble when the modular AGV is turning and exhibits a constant deceleration trajectory (i.e., positive linear and angular velocities) in view of a sensed obstacle. In an embodiment, the position and heading of the modular AGV over time can be represented as x(t), y(t), θ(1). Using local coordinates at an instant the safety management system is engaged, the initial boundary conditions can be defined in accordance with the following expression:

$$\theta(0) = x(0) = y(0) = 0$$

In an embodiment, when the safety management system is engaged, the modular AGV decreases its linear velocity (v) at a constant rate (a) and decrease its angular velocity (ω) at a constant rate (a). In an embodiment, the time derivative of the modular AGV's heading can be represented by the following:

$$\dot{\theta}(t) = \omega - \alpha t$$

In an embodiment, integrating and leveraging the initial boundary condition θ(0) = 0 results in:

$$\theta(t) = \omega t - \alpha t_2/2$$

In an embodiment, the Cartesian coordinates of the modular AGV can be determined using the following expressions:

$$\dot{x}(t) = (v-at)\cos(\theta(t)) = (v-at)\cos(\omega t - \alpha t^2/2) \text{ and}$$

$$\dot{y}(t) = (v-at)\sin(\theta(t)) = (v-at)\sin(\omega t - \alpha t^2/2).$$

In an embodiment, integrating using a computational knowledge engine (e.g., Wolfram Alpha) and applying the Fresnel Integral transcendental functions:

$$S(z) = \left|\int_0^z \sin(u^2)du \text{ and } C(z) = \int_0^z \cos(u^2)du,\right.$$

the following can be determined:

$$x(t) = A_2 C\left(\frac{\dot{\theta}(t)}{\sqrt{\alpha\pi}}\right) + A_1 S\left(\frac{\dot{\theta}(t)}{\sqrt{\alpha\pi}}\right) + \frac{a}{\alpha}\sin(\theta(t)) + K_z$$

and $$y(t) = A_1 C\left(\frac{\dot{\theta}(t)}{\sqrt{\alpha\pi}}\right) - A_2 S\left(\frac{\dot{\theta}(t)}{\sqrt{\alpha\pi}}\right) - \frac{a}{\alpha}\cos(\theta(t)) + K_y$$

where Kx,Ky are respective integration constants, and the coefficients are defined as follows:

$$A_1 = \frac{\sqrt{\pi}(a\omega - \alpha v)}{\alpha^{3/2}}\sin\left(\frac{\omega^2}{2\alpha}\right)$$

and $$A_2 = \frac{\sqrt{\pi}(a\omega - \alpha v)}{\alpha^{3/2}}\cos\left(\frac{\omega^2}{2\alpha}\right).$$

In an embodiment, the boundary conditions (x(0) = 0, y(0) = 0, θ(0) = 0, θ̇(0) = ω) to determine the integration constants, according to the following expressions:

$$K_x = -A_2 C\left(\frac{\omega}{\sqrt{\alpha\pi}}\right) - A_1 S\left(\frac{\omega}{\sqrt{\alpha\pi}}\right)$$

and $$K_y = -A_1 C\left(\frac{\omega}{\sqrt{\alpha\pi}}\right) + A_2 S\left(\frac{\omega}{\sqrt{\alpha\pi}}\right) + \frac{a}{\alpha}.$$

In an embodiment, a time at which the modular AGV stops rotating can be defined as t1 = ω/a and the associated state of the modular AGV can be identified as (x1, y1, θ1). In an embodiment, a time the modular AGV stops translating can be defined as t2 = v/a, with a state of (x2, y2, θ2). In an embodiment, it is assumed that the modular AGV stops rotating before it stops translating (i.e., ω/a ≤ v/a). In computing the value of the modular AGV states, it is noted that $\theta_1 = \omega^2/(2a)$ and $\dot{\theta}_1 = 0$. In an embodiment, since both Fresnel Integral functions cross the origin (i.e., C(0) = S(0) = 0), it is determined that:

$$x_1 = \frac{a}{\alpha}\sin\theta_1 + K_x$$

and $$y_1 = -\frac{a}{\alpha}\cos\theta_1 + K_y.$$

In an embodiment, the modular AGV can determine a safety bubble when the modular AGV is turning and exhibits a constant curvature trajectory (i.e., the linear and angular velocities are constant until the safety management system engages) in view of a sensed obstacle. Once engaged, the linear velocity is decreased at a constant rate, and the angular velocity adjust to keep the modular AGV on a circular arc. In an embodiment, if the linear velocity decreases at a rate of a, then the angular velocity decreases at a rate of α = ωa/v. In an embodiment, many of the complex terms in the equations of motion, such as the Fresnel Integral functions, become zero, and the resulting equations are as follows:

$$\theta(t) = \omega t - \frac{\omega a}{2v}t^2$$

$$x(t) = \frac{v}{\omega}\sin\theta(t)$$

$$y(t) = \frac{v}{\omega}(1 - \cos\theta(t)).$$

Figure 10:
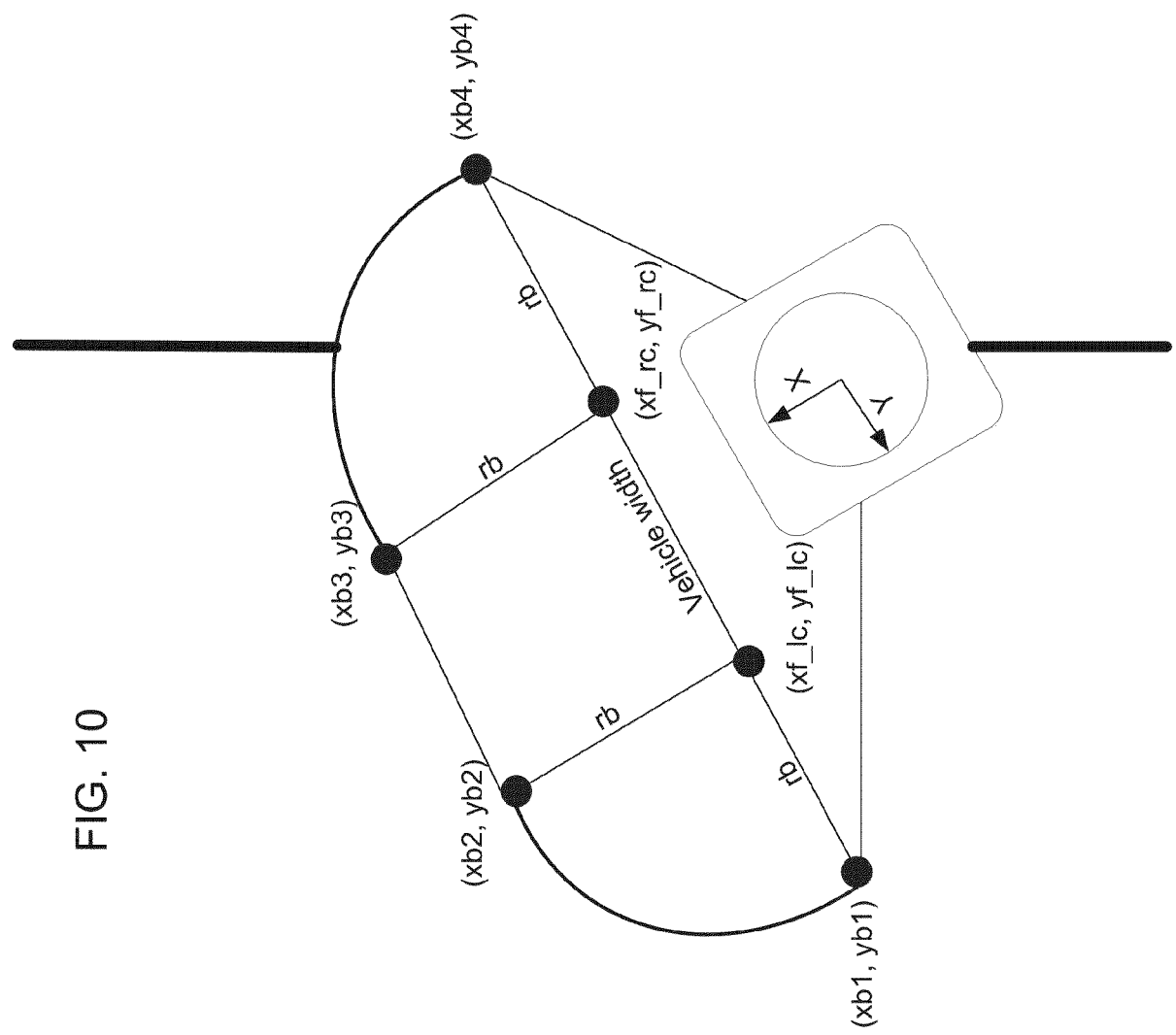
FIG. 10 illustrates an example diagram including safety management processing relating to a modular autonomous ground vehicle and a corresponding safety bubble to protect a full front edge of the modular autonomous ground vehicle, according to one embodiment.

In an embodiment, the safety management system of the modular AGV is configured to establish a safety bubble to protect the full front edge of the modular AGV. As shown in FIG. 10, after computing the modular AGV's stopping position and heading, the safety bubble can be computed according to the following process. In an embodiment, the safety management system can compute the positions of the modular AGV's front-left corner (xf_lc,yf_lc) and front-right corner (xf_rc,yf_rc). The safety management system can compute the safety bubble radius (rb) using the following expression:

$$rb = vpt2 + rp,$$

where t2 is the time it takes the vehicle to stop, vp is the assumed speed of a detected obstacle (e.g., 1.6 m/s) and rp is the assumed radius of the detected obstacle (e.g., 0.1 m). In an embodiment, the obstacle radius can also serve as a parameter to represent sensor position error.

In an embodiment, the safety bubble is composited a straight edge directly in front of the vehicle's stopping position, rb away from the modular AGV's front edge. Next, two quarter-circle arcs of radius rb are added on either side of the straight edge, protecting the front-left and front-right corners of the modular AGV. In an embodiment, the four vertices of the safety bubble are labeled (xb1,yb1), (xb2,yb2), (xb3,yb3), (xb4,yb4) for reference in source code equations. In an embodiment, a local reference frame centered at the center of the vehicle at its initial position and heading is shown in FIG. 10, where the x-axis is in the direction of motion and the y-axis is toward the left hand side of the modular AGV.

In an embodiment, the safety management system can be configured to employ the aforementioned processing to calculate the boundaries of a potential collision with a detected obstacle for every point/theta, for every theta in every point received (wherein the result is cached per theta, and therefore for significantly small « δθ the points cached could be interpolated to provide a collision buffer), or once per state update (wherein all theta and points are cached and every theta is looked up in a table and for thetas in between two cached results, the boundary is interpolated.

Figure 11:
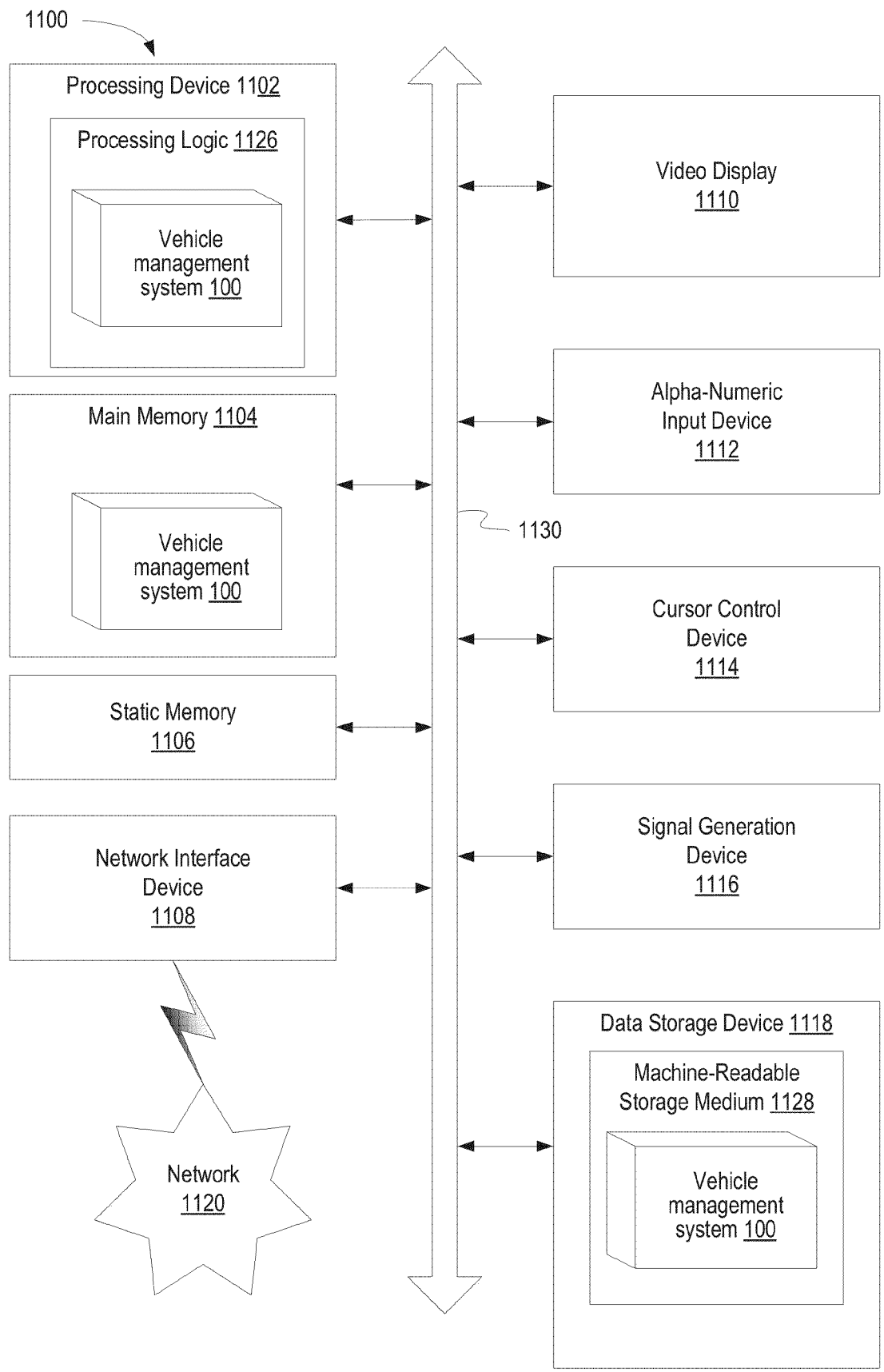
FIG. 11 illustrates a diagrammatic representation of a machine in the example form of a computer system including a set of instructions executable by a computer to manage an autonomous ground vehicle in a dynamic environment according to any one or more of the methodologies discussed herein.

FIG. 11 illustrates a diagrammatic representation of a machine in the example form of a computer system 1100 including a set of instructions executable by a computer to deliver a product to a customer by autonomous delivery robot system according to any one or more of the methodologies discussed herein. In one embodiment, the computer may include instructions to enable execution of the processes and corresponding components shown and described in connection with FIGS. 1-10.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. In various implementations of the present disclosure, the processing device 1102 is configured to execute instructions for the vehicle management system 100 for performing the operations and processes described herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable storage medium 1128 (or machine-readable medium) on which is stored one or more sets of instructions of the vehicle management system 100 embodying any one or more of the methodologies or functions described herein. The instructions may also reside, completely or at least partially, within the main memory 1104 and/or within processing logic 1126 of the processing device 1102 during execution thereof by the computer system 1100, the main memory 1104 and the processing device 1102 also constituting computer-readable media.

The instructions may further be transmitted or received over a network 1120 via the network interface device 1108. While the computer-readable storage medium 1128 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing", "applying", "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   collecting, by a processing device of an autonomous robotic vehicle operating in an environment, a first set of data corresponding to the environment from a first sensor;
   collecting a second set of data corresponding to the environment from the first sensor;
   generating, in view of the first set of data, a first two dimensional depth map comprising a first set of pixels;
   generating, in view of the second set of data, a second two dimensional depth map comprising a second set of pixels;
   translating the first two dimensional depth map into a first three dimensional point cloud comprising a first set of voxels;
   translating the first two dimensional depth map into a second three dimensional point cloud comprising a second set of voxels;
   downsampling the first set of voxels of the first three dimensional point cloud to generate a first subset of downsampled voxels;
   downsampling the second set of voxels of the second three dimensional point cloud to generate a second subset of downsampled voxels;
   detecting an error in view of a comparison of the first subset of downsampled voxels and the second subset of downsampled voxels; and
   executing a safety control command in view of the error.

2. The method of claim 1, further comprising identifying a region relative to the vehicle in view of a current velocity of the vehicle, wherein the region comprises a minimum distance for stopping the vehicle in response to detection of an obstacle in the environment.

3. The method of claim 2, further comprising:
   detecting a first obstacle within the region, wherein the safety control command comprises a stop command.

4. The method of claim 3, wherein downsampling the first set of voxels comprises discarding one or more voxels that include a number of points that is less than or equal to a minimum point threshold value.

5. A method comprising:
   generating, by a processing device of a vehicle, a first three dimensional point cloud in view of first data collected from a first sensor of the vehicle;
   generating a second three dimensional point cloud in view of second data collected from a second sensor of the vehicle;
   comparing a first set of points of the first three dimensional point cloud and a second set of points of the second three dimensional point cloud to detect an error, wherein the comparing comprises:
      generating a score representing a level of corroboration between the first three dimensional point cloud and the second three dimensional point cloud, wherein the error is detected in response to determining the score is below a threshold score value; and executing, by the processing device, a safety control command in view of the error.

6. The method of claim 5, further comprising:
   downsampling the first three dimensional point cloud to generate a first subset of voxels; and
   downsampling the second set of voxels of the second three dimensional point cloud to generate a second subset of voxels.

7. The method of claim 5, further comprising establishing a common frame of reference between the first three dimensional point cloud and the second three dimensional point cloud in view of at least one of a mounting offset or a timing offset.

8. The method of claim 7, further comprising determining the timing offset in view of at least one of velocity of the vehicle or a latency between a first time that the first data is captured by the first sensor and a second time that the first data is received by the processing device.

9. The method of claim 7, further comprising determining the mounting offset in view of comparison of a first mounting location on the vehicle of the first sensor and a second mounting location on the vehicle of the second sensor.

10. The method of claim 5, wherein comparing the first three dimensional point cloud and the second three dimensional point cloud further comprises:
    increasing a count corresponding to a number of the corresponding second set of points that are within a first voxel size, wherein the score is based at least in part on the count.

11. The method of claim 5, further comprising:
    determining a set of coordinates of an obstacle at a first time;

determining a distance between the vehicle and the obstacle in view of the set of coordinates; and identifying a region relative to the vehicle in view of the distance between the vehicle and the obstacle and an estimated speed of the obstacle, wherein the region comprises a minimum distance for stopping the vehicle in response to detection of the obstacle.

12. The method of claim 11, wherein the error represents a detection of the obstacle in the region.

13. The method of claim 5, wherein the error represents a detection of an obstacle in view of the first three dimensional point cloud, and wherein the obstacle is not detected in view of the second three dimensional point cloud.

14. A vehicle comprising:
a first sensor to detect first data corresponding to an environment of the vehicle
a second sensor to detect second data corresponding to the environment;
a processing device operatively coupled to the first sensor and the second sensor, the processing device to execute instructions to:
generate, in view of the first data collected from the first sensor, a first three dimensional point cloud;
generate, in view of the second data collected from the second sensor, a second three dimensional point cloud;
compare a first set of points of the first three dimensional point cloud and a second set of points of the second three dimensional point cloud to detect an error to generate a score representing a level of corroboration between the first three dimensional point cloud and the second three dimensional point cloud, wherein the error is detected in response to determining the score is below a threshold score value; and
execute a safety control command in view of the error.

15. The vehicle of claim 14, the processing device further to:
downsample the first three dimensional point cloud to generate a first subset of voxels; and
downsample the second set of voxels of the second three dimensional point cloud to generate a second subset of voxels.

16. The vehicle of claim 14, the processing device further to establish a common frame of reference between the first three dimensional point cloud and the second three dimensional point cloud in view of at least one of a mounting offset or a timing offset.

17. The vehicle of claim 16, the processing device further to determine the timing offset in view of at least one of velocity of the vehicle or a latency between a first time that the first data is captured by the first sensor and a second time that the first data is received by the processing device.

18. The vehicle of claim 16, the processing device further to determine the mounting offset in view of comparison of a first mounting location on the vehicle of the first sensor and a second mounting location on the vehicle of the second sensor.

19. The vehicle of claim 14, wherein comparing the first three dimensional point cloud and the second three dimensional point cloud further comprises:
increase a count corresponding to a number of the corresponding second set of points that are within a first voxel size, wherein the score is based at least in part on the count.

20. The vehicle of claim 14, the processing device further to:
determine a set of coordinates of an obstacle in the environment at a first time;
determine a distance between the vehicle and the obstacle in view of the set of coordinates; and
identify a region relative to the vehicle in view of the distance between the vehicle and the obstacle and an estimated speed of the obstacle, wherein the region comprises a minimum distance for stopping the vehicle in response to detection of the obstacle.

* * * * *